United States Patent
Kurihara et al.

(10) Patent No.: US 8,369,368 B2
(45) Date of Patent: *Feb. 5, 2013

(54) LASER DRIVING DEVICE, LASER DRIVING METHOD, OPTICAL UNIT, AND LIGHT DEVICE

(75) Inventors: Tsutomu Kurihara, Kanagawa (JP); Motoi Kimura, Kanagawa (JP); Koichi Yokoyama, Kanagawa (JP)

(73) Assignee: Sony Corporation, Tokyo (JP)

( * ) Notice: Subject to any disclaimer, the term of this patent is extended or adjusted under 35 U.S.C. 154(b) by 293 days.

This patent is subject to a terminal disclaimer.

(21) Appl. No.: 12/659,320

(22) Filed: Mar. 4, 2010

(65) Prior Publication Data

US 2010/0260029 A1 Oct. 14, 2010

(30) Foreign Application Priority Data

Apr. 9, 2009 (JP) ................... 2009-094633

(51) Int. Cl.
*H01S 3/00* (2006.01)

(52) U.S. Cl. ..................... 372/38.02; 369/100
(58) Field of Classification Search .............. 372/38.02; 369/100
See application file for complete search history.

(56) References Cited

U.S. PATENT DOCUMENTS

| 6,222,815 | B1 * | 4/2001 | Nagano .................. 369/47.51 |
| 7,535,941 | B2 * | 5/2009 | Inoue et al. ............. 372/38.02 |
| 8,107,342 | B2 * | 1/2012 | Kurihara et al. ......... 369/59.23 |
| 8,199,625 | B2 * | 6/2012 | Kurihara et al. ......... 369/59.11 |
| 2009/0086603 | A1 * | 4/2009 | Kuroda .................... 369/100 |

FOREIGN PATENT DOCUMENTS

JP 2007-141406 6/2007

* cited by examiner

*Primary Examiner* — Yuanda Zhang
(74) *Attorney, Agent, or Firm* — Rader, Fishman & Grauer PLLC

(57) ABSTRACT

Disclosed herein is a laser driving device including: a sample-hold section; a first pulse generating section; a second pulse generating section; a light emission waveform generating section; a storing section; and a sampling pulse generating section.

13 Claims, 27 Drawing Sheets

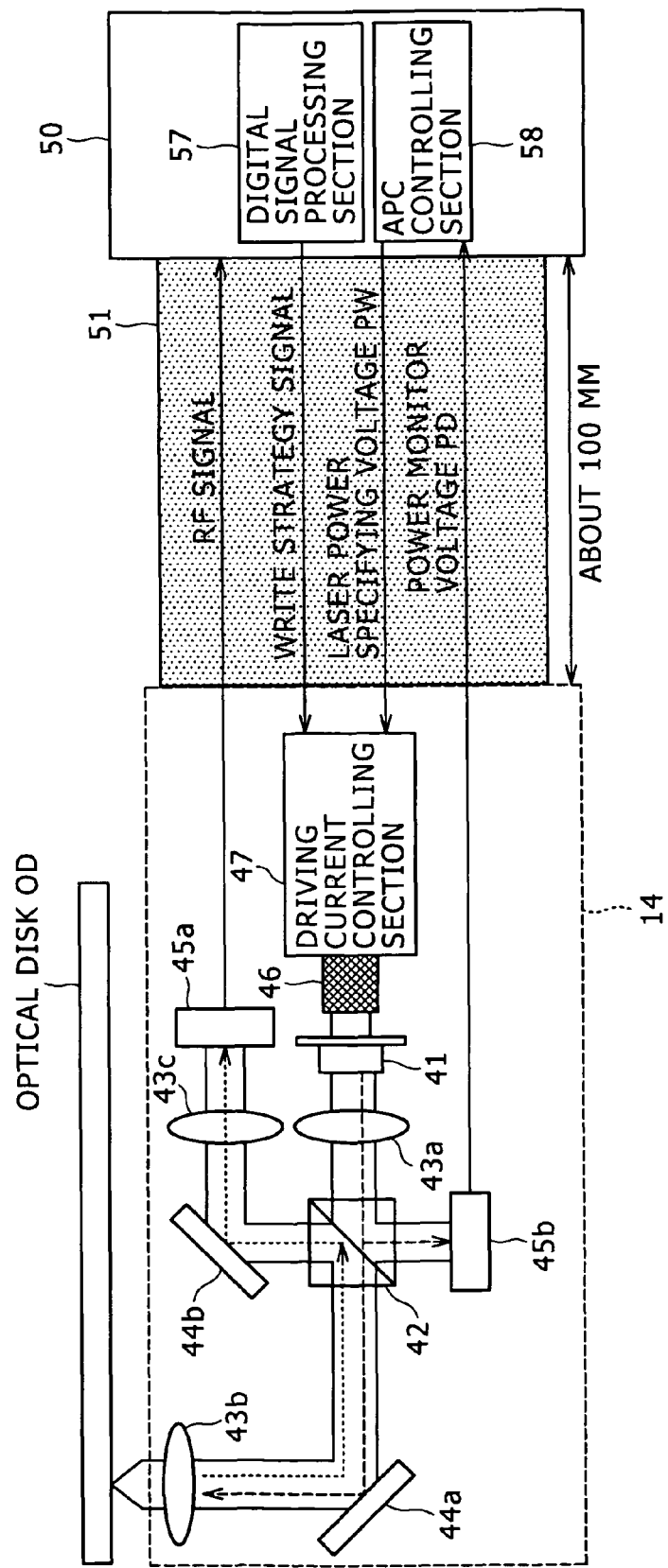

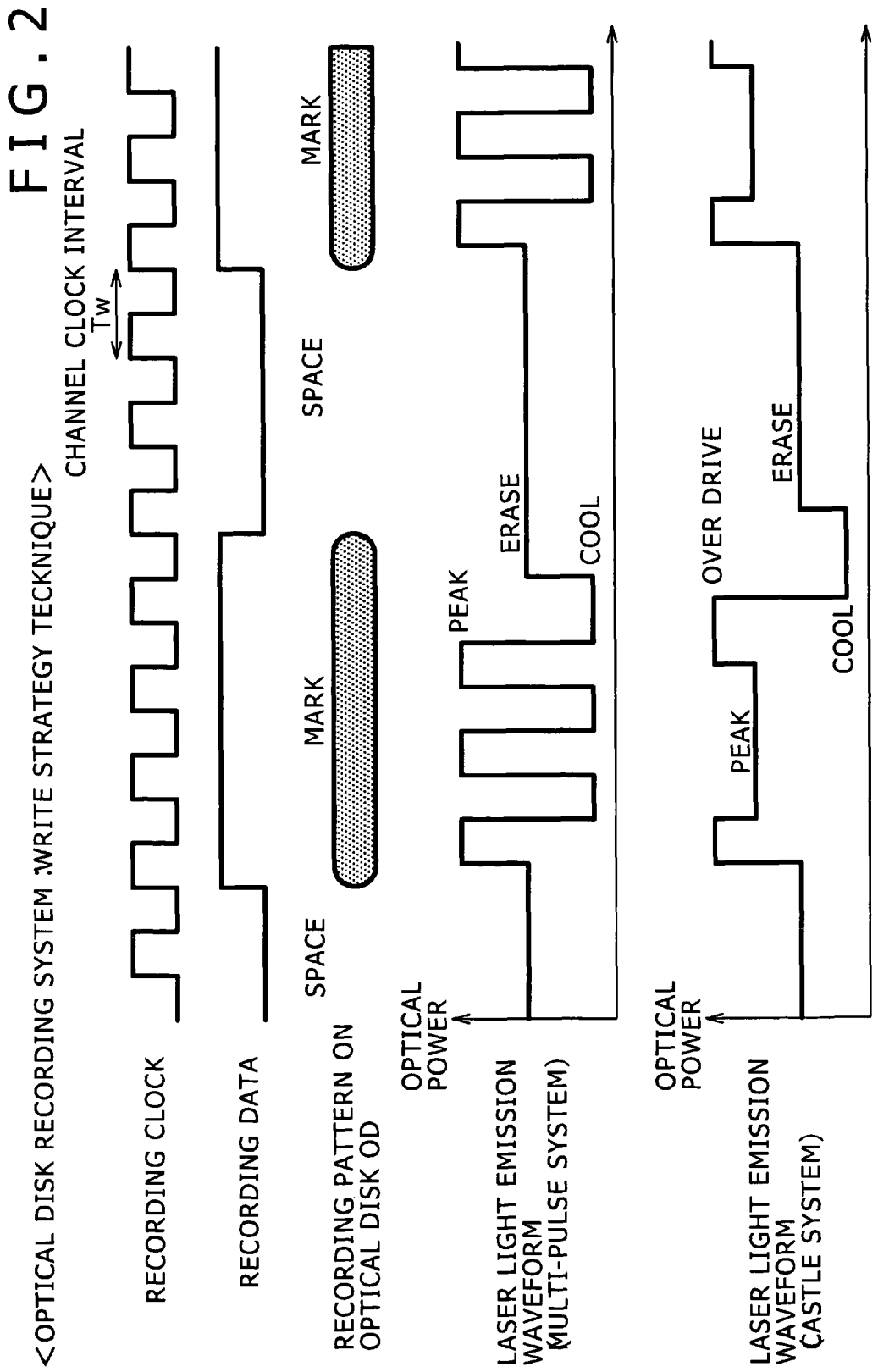

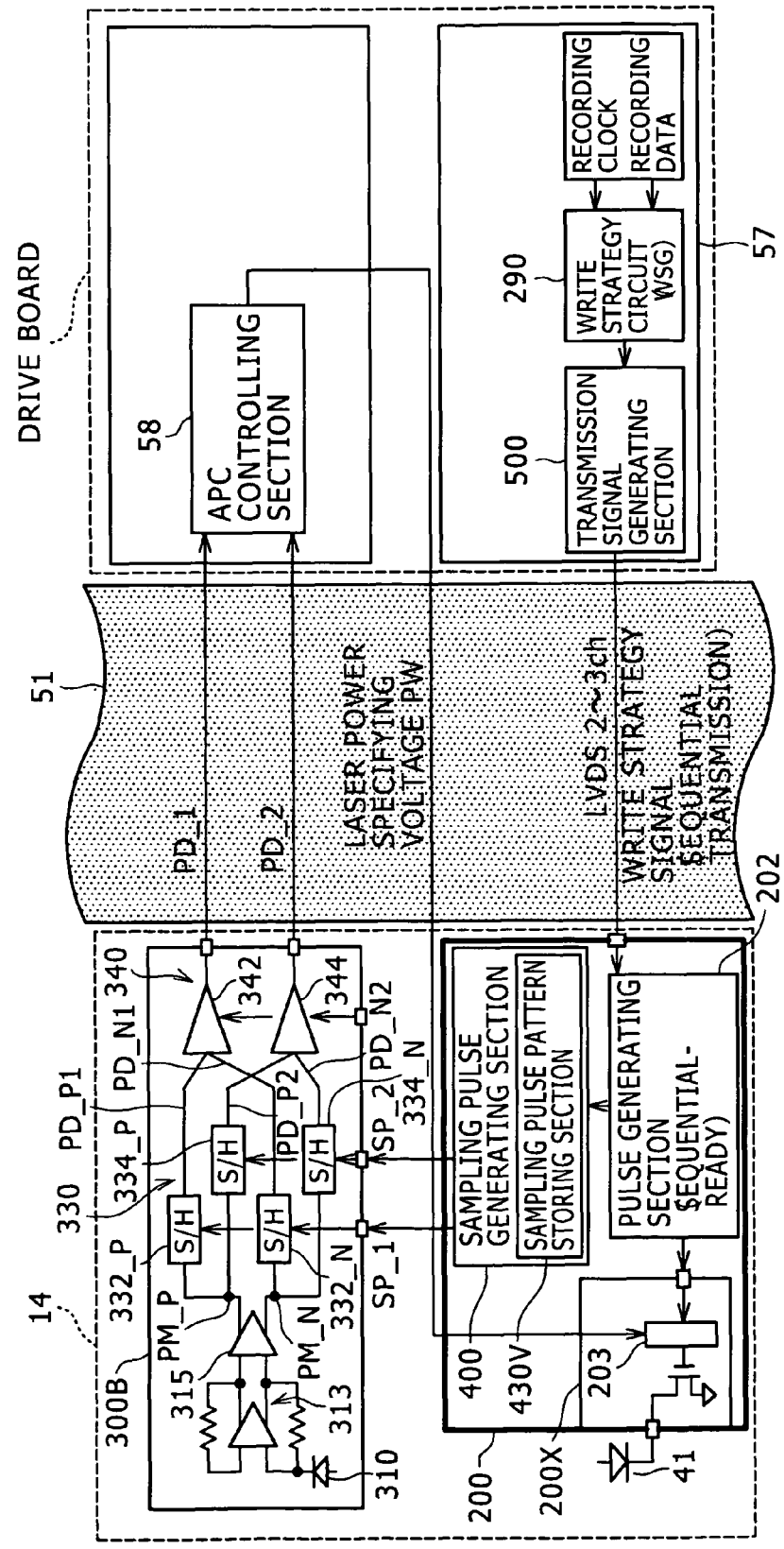

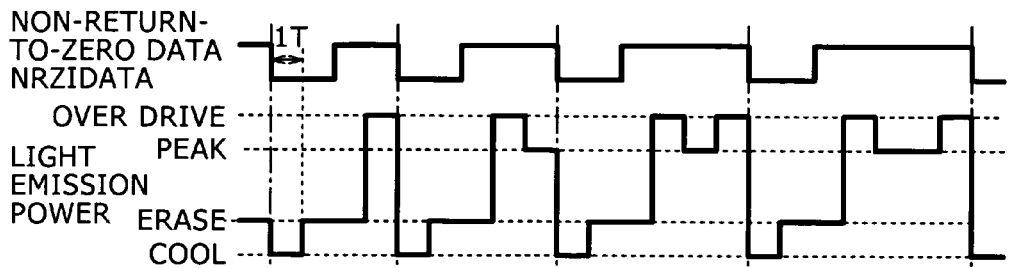
FIG.3B
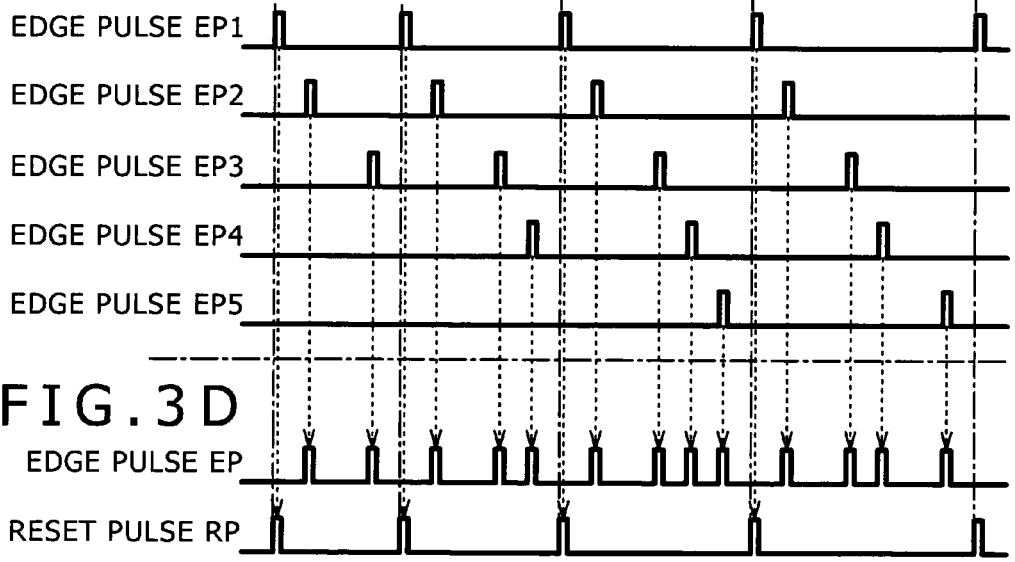
FIG.3C
FIG.3D
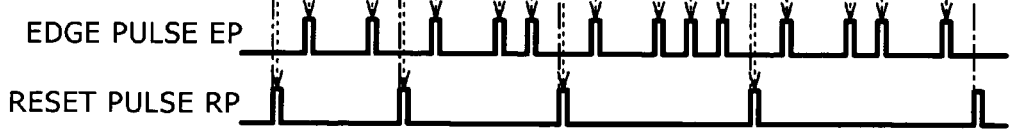
FIG.3E
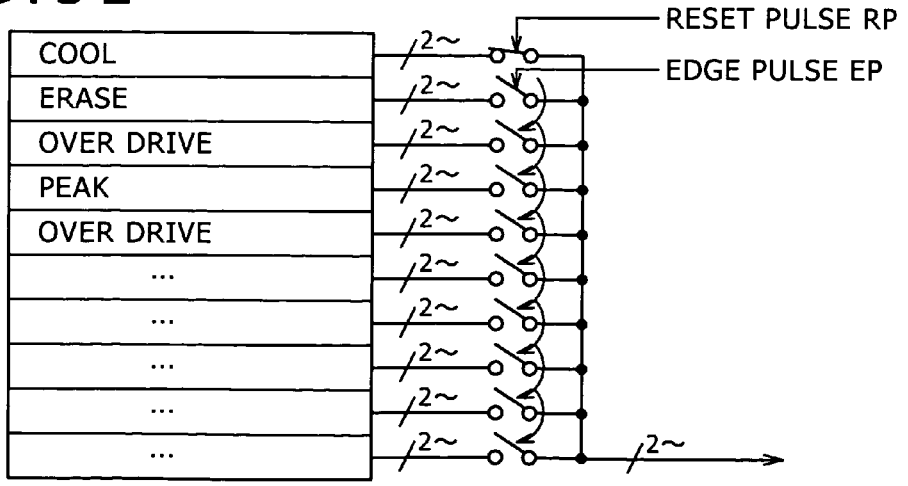

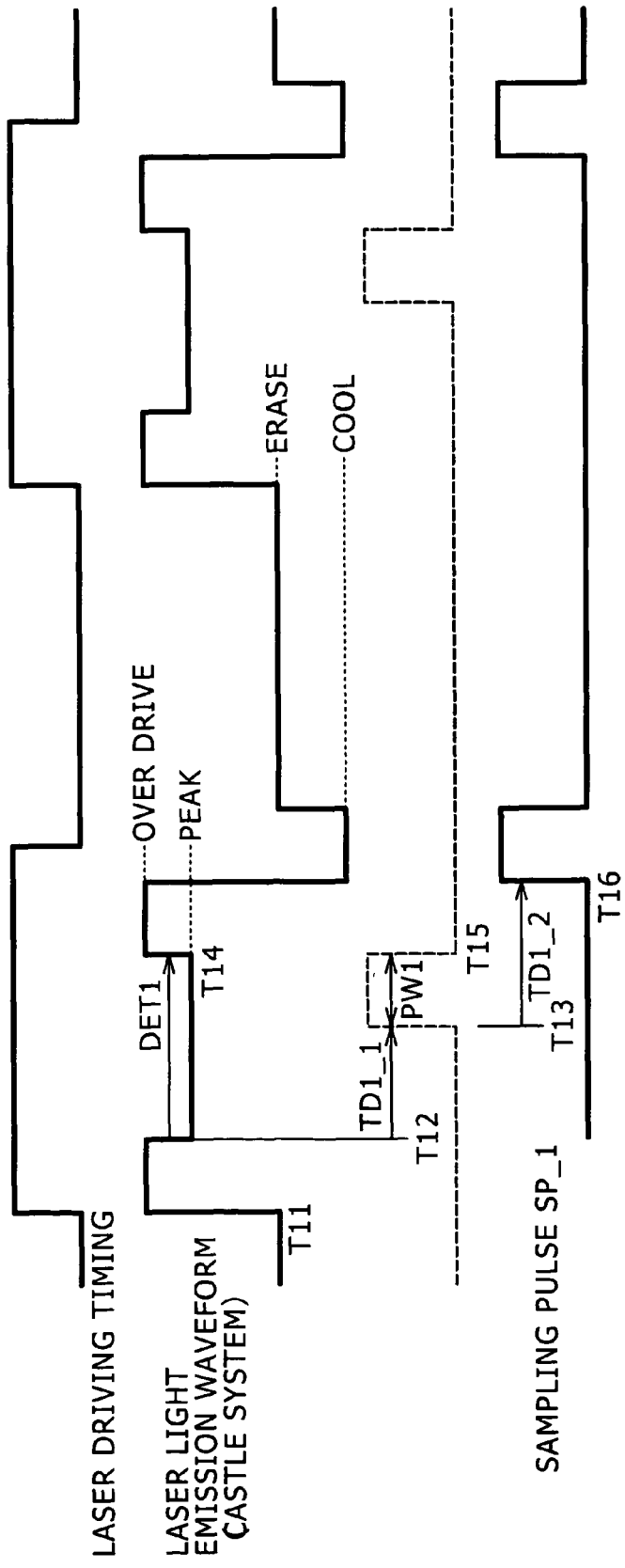

<SEQUENTIAL SYSTEM :BASIC>

FIG. 6A
<SEQUENTIAL SYSTEM :BASIC>

FIG. 6B
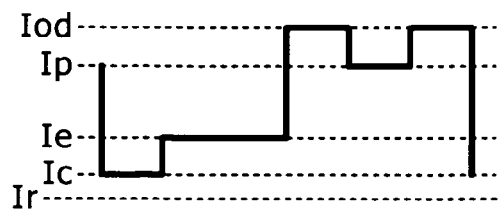
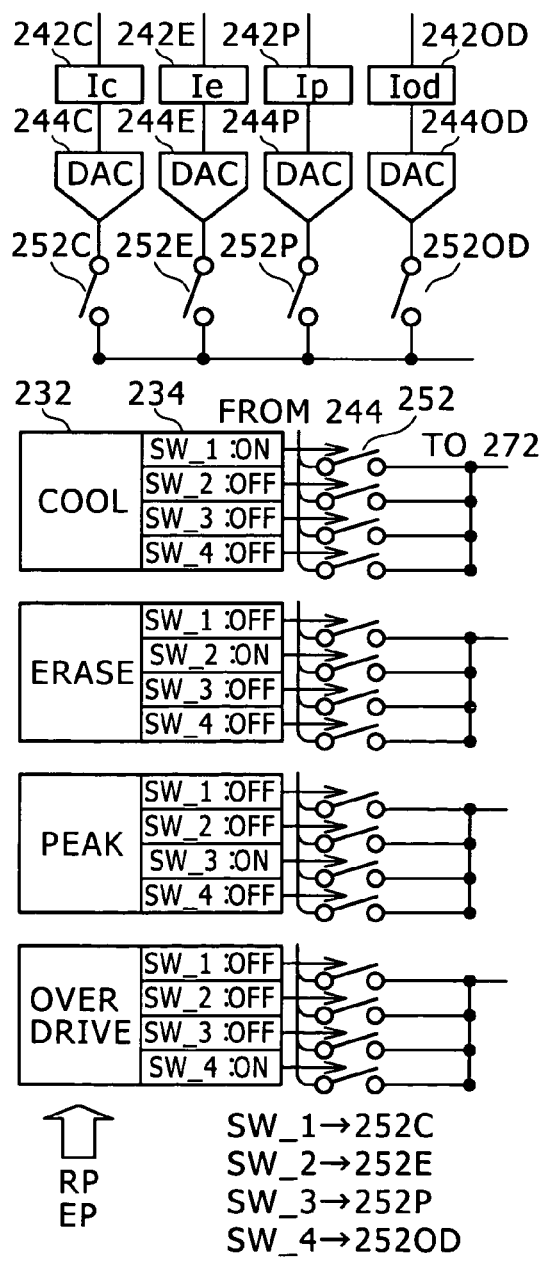

<SEQUENTIAL ACCESS MEMORY WITH RESET FUNCTION>

<FIRST EMBODIMENT (BASIC EXAMPLE)>
* EXAMPLE OF APPLICATION TO SUPERIMPOSITION OF SAMPLING PULSE TIMING FOR SPACE AND MARK (SUPERIMPOSITION OF STARTING AND ENDING TIMING INFORMATION ON EDGE SIGNAL ES)

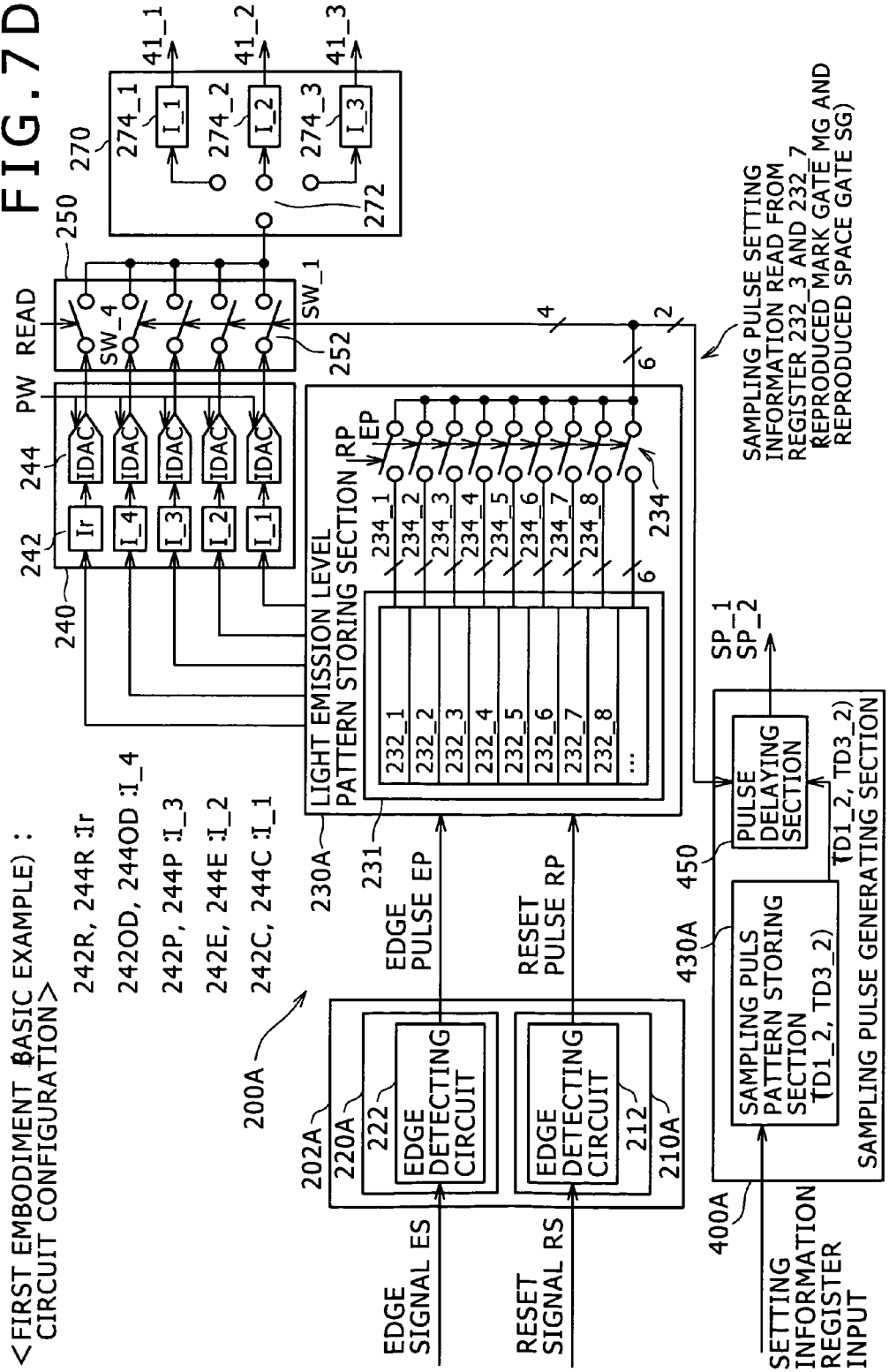

<FIRST EMBODIMENT :BASIC EXAMPLE>
OPERATION OF LASER DRIVING CIRCUIT

<SEQUENTIAL ACCESS MEMORY WITH RESET FUNCTION>
(FIRST EMBODIMENT :BASIC EXAMPLE)

* STARTING TIMING AND ENDING TIMING OF SAMPLING
  PULSE ARE SET IN REGISTERS TOGETHER WITH POWER
  LEVEL INFORMATION

<FIRST EMBODIMENT (TRANSFORMATION EXAMPLE)>
 *EXAMPLE OF APPLICATION TO SUPERIMPOSITION OF SAMPLING PULSE TIMING FOR SPACE AND MARK
  $UPERIMPOSITION OF ONLY STARTING INFORMATION ON EDGE SIGNAL ES)

<SEQUENTIAL ACCESS MEMORY WITH RESET FUNCTION>
(FIRST EMBODIMENT :TRANSFORMATION EXAMPLE)

* ONLY STARTING TIMING OF SAMPLING PULSE IS SET IN REGISTERS TOGETHER WITH POWER LEVEL INFOMATION
* ENDING TIMING IS DEFINED BY TIMING OF CHANGING TO NEXT LEVEL (OVER DRIVE)

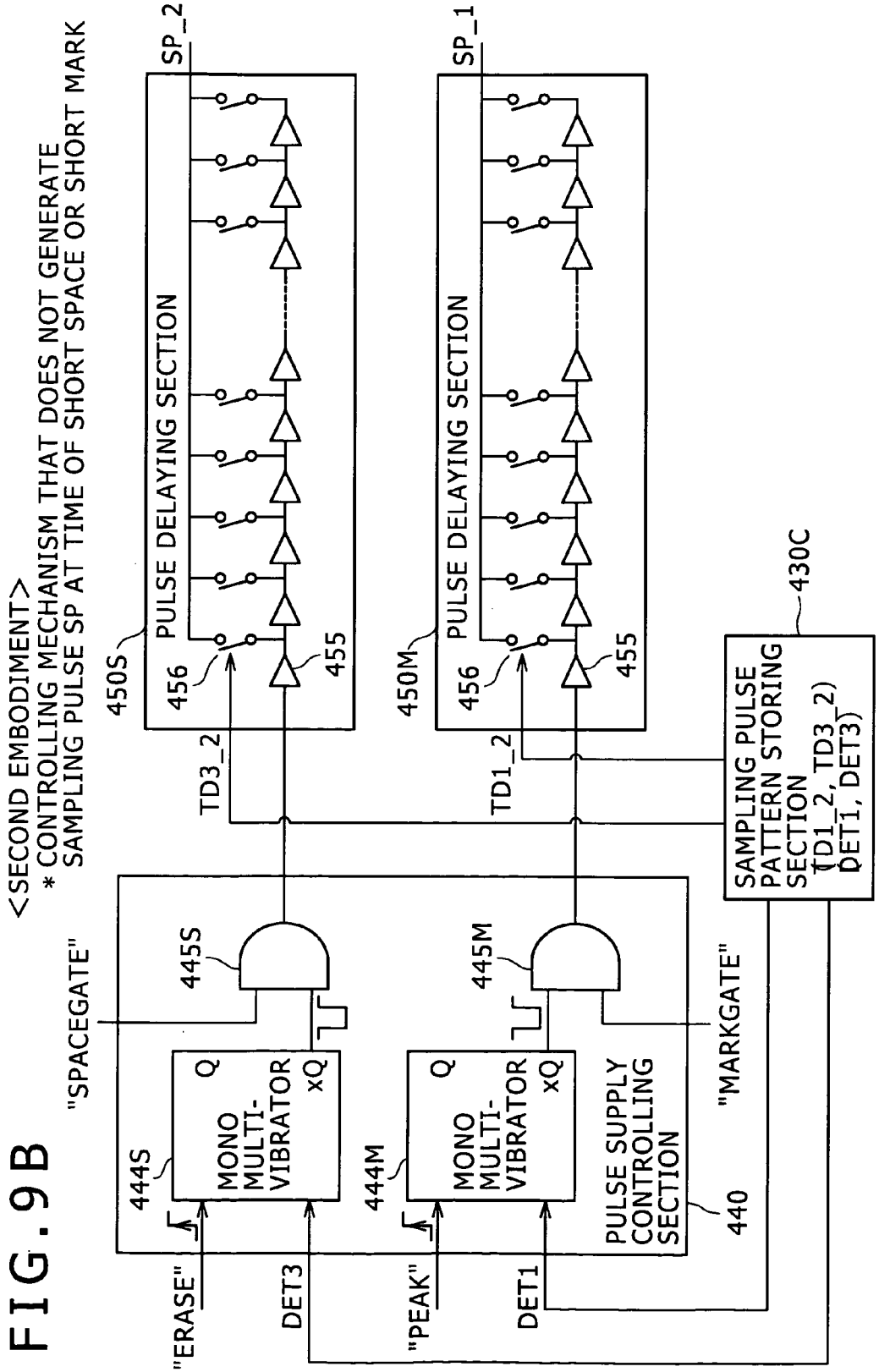

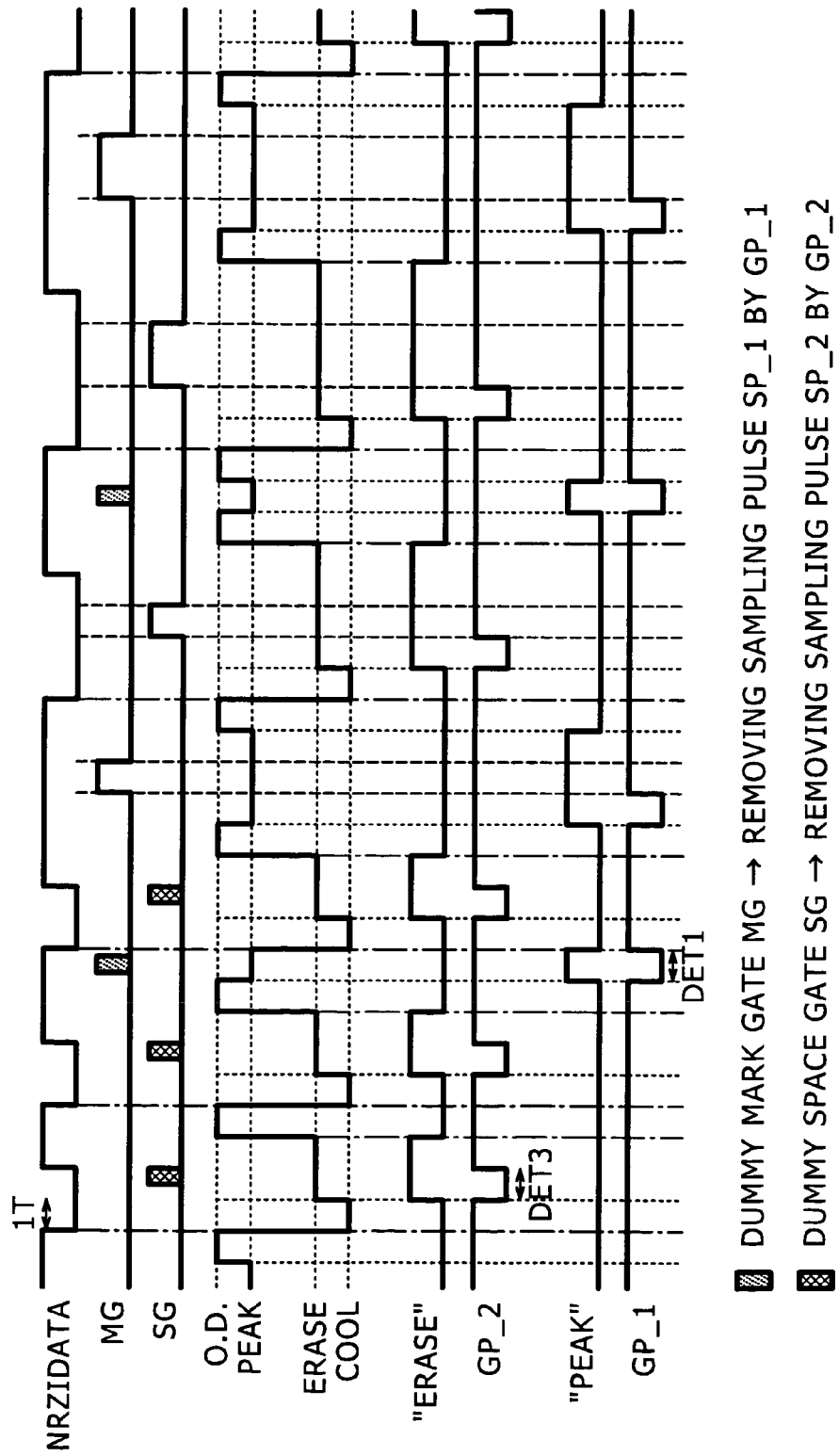

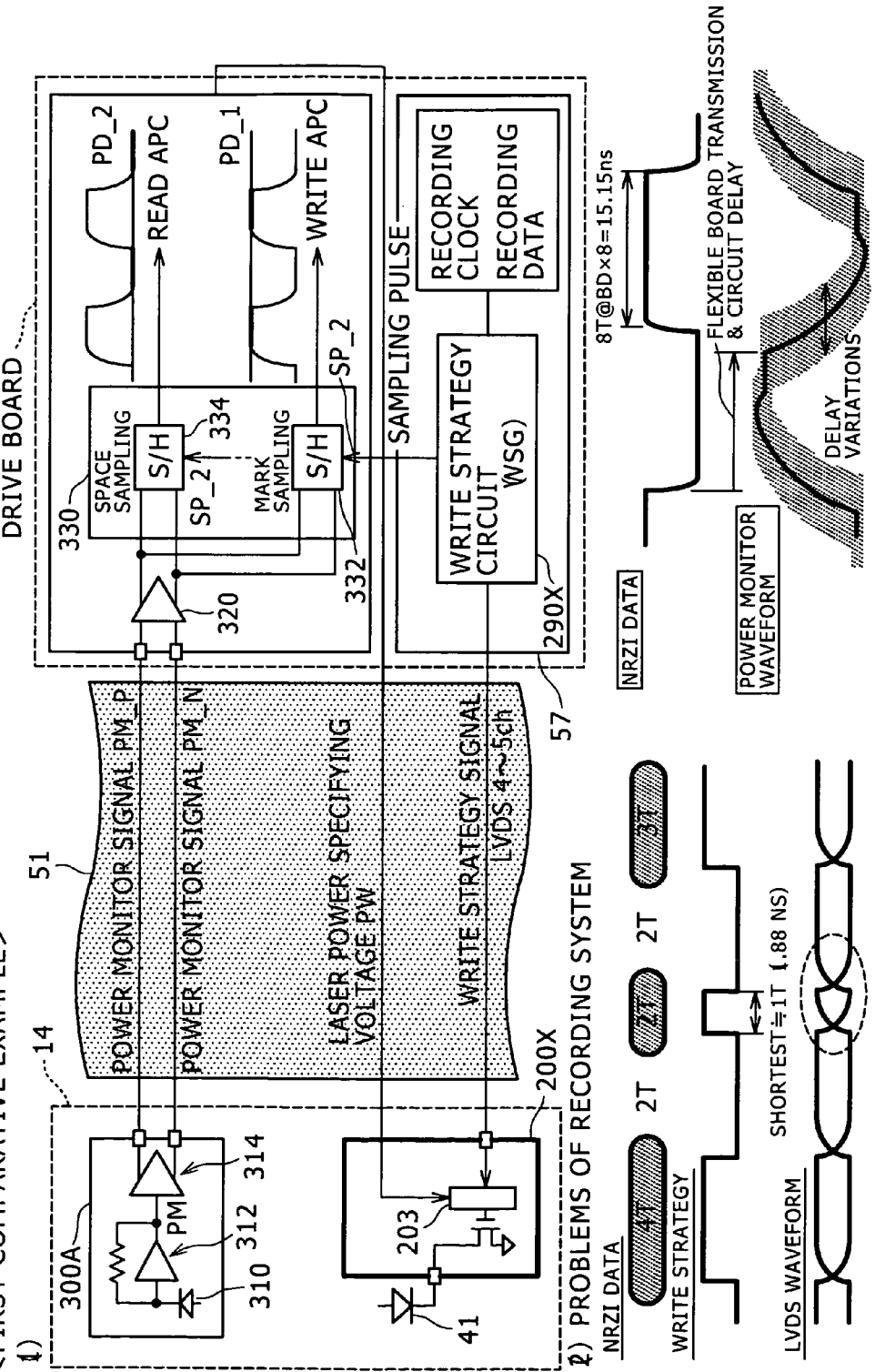

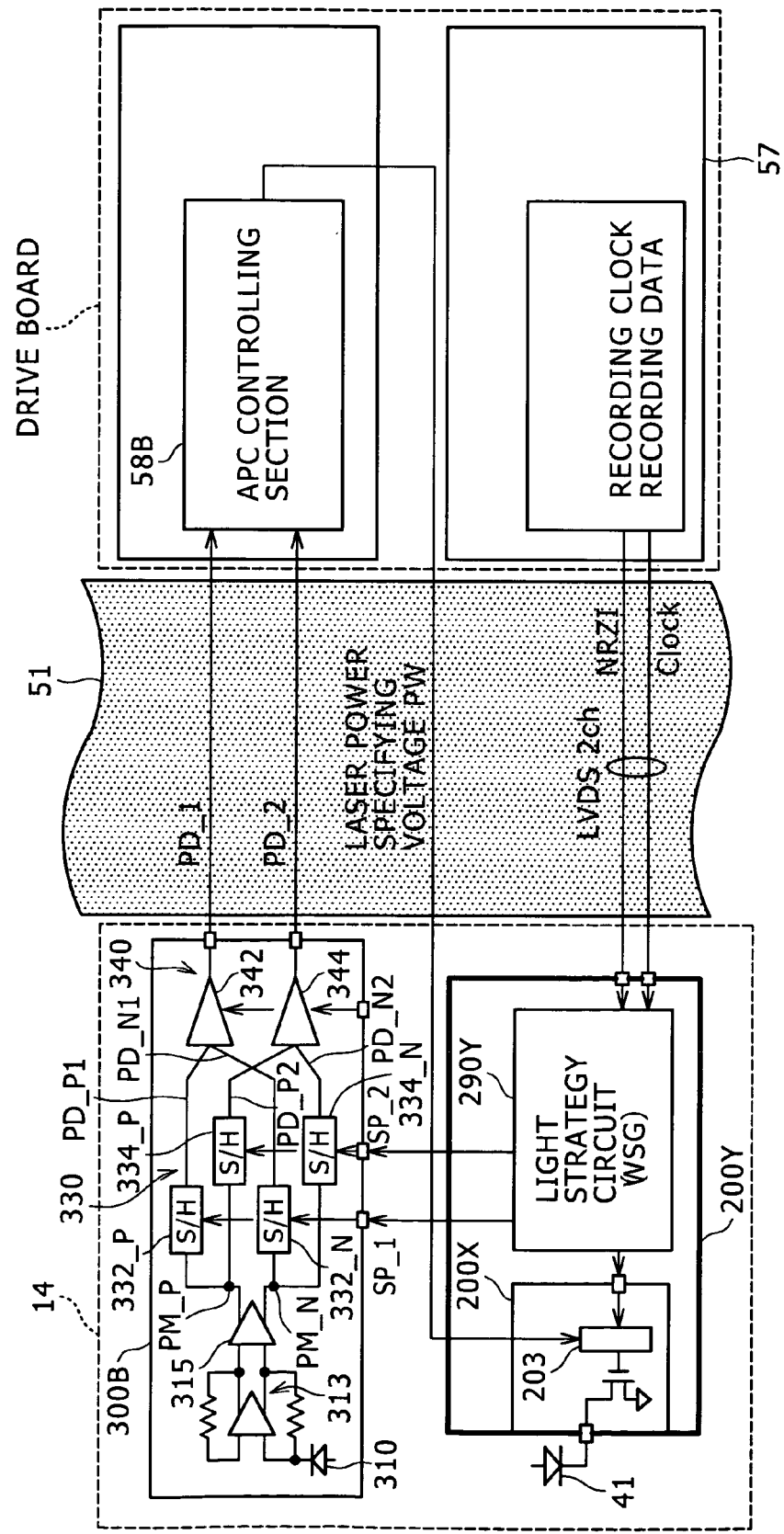

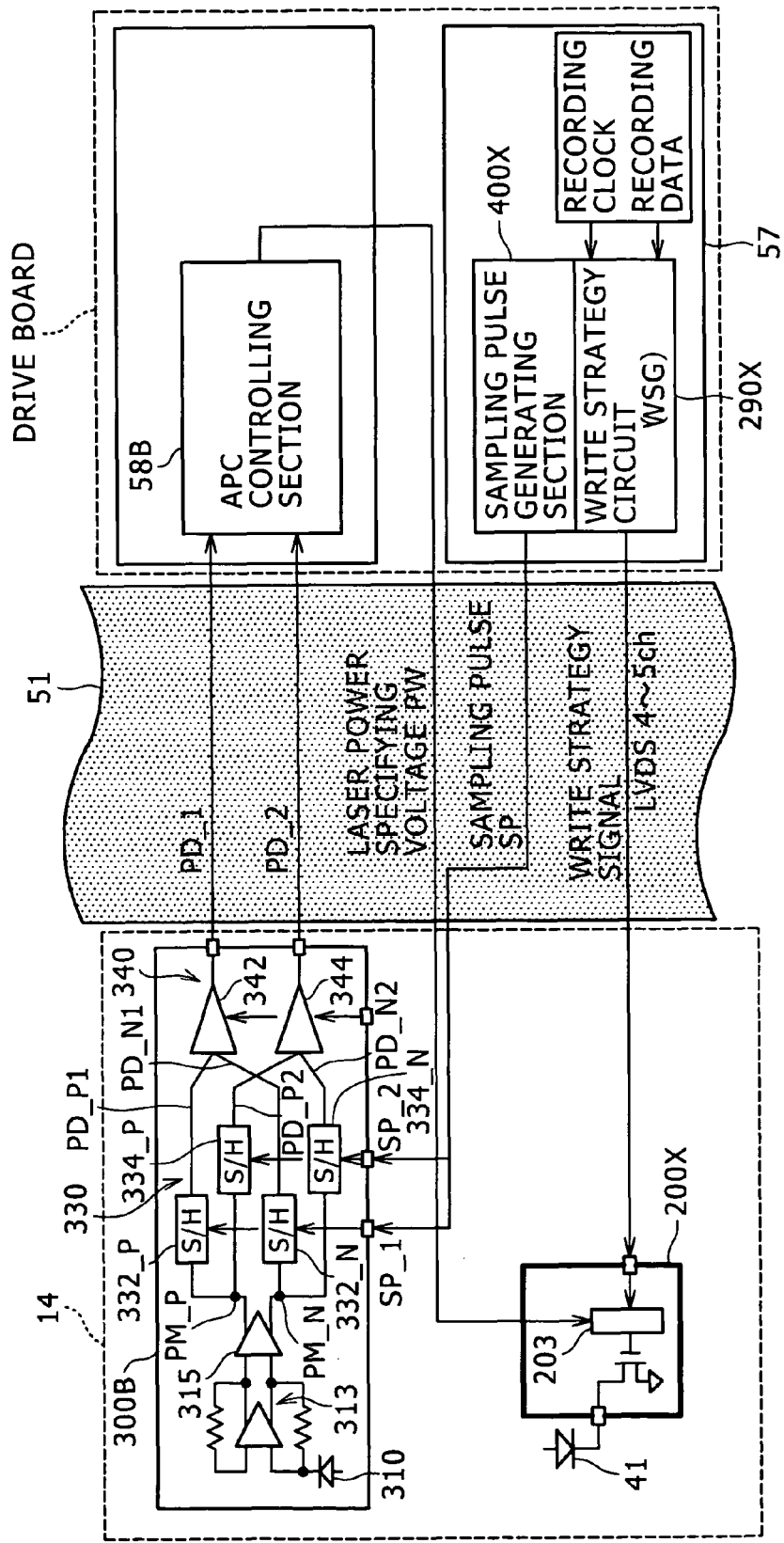

LASER DRIVING DEVICE, LASER DRIVING METHOD, OPTICAL UNIT, AND LIGHT DEVICE

BACKGROUND OF THE INVENTION

1. Field of the Invention

The present invention relates to a laser driving device (laser driving circuit), a laser driving method, an optical unit, and a light device.

2. Description of the Related Art

Recording and reproducing devices using a laser as a light source are used in various fields. For example, attention is directed to optical disk recording and reproducing devices (hereinafter referred to simply as optical disk devices) using a laser driving device and an optical unit and using an optical disk as a recording and reproducing medium.

As the laser used as light source, semiconductor lasers using semiconductor materials have recently been widely used in various devices because the semiconductor lasers are very small and respond to driving current at high speed.

As a writable optical disk used as a recording and reproducing medium, a phase change optical disk, a magneto-optical disk and the like are widely known. Recording, reproduction, and erasure are performed on these optical disks by changing the intensity of an applied laser beam. Generally, when information is recorded onto an optical disk, a so-called light intensity modulation system is used which forms marks and spaces on the recording medium by changing the intensity of a laser beam. At this time, the optical disk is irradiated with a laser beam of high intensity having a peak of 30 mW or more, for example. At a time of reproduction, the optical disk is irradiated with a laser beam of lower intensity (for example 1 mW) than at the time of recording so as to be able to read information without destroying recorded marks.

Mark edge recording, which provides information at positions of both edges of a recorded mark, has become mainstream on recent writable optical disks because of advantages in increasing the density of the optical disks. In the mark edge recording, a data error is caused by distortion of the shape of a mark. A write strategy technique is known in which recording power is pulse-divided, converted to multivalued levels, and controlled to perform recording with fewer errors (see for example Japanese Patent Laid-open No. 2007-141406 and "Low Noise and High-Speed Response at Highest Levels in the Field Overcoming Technological Barriers of Blu-ray Eight-Times Speed Recording and Reproduction," CX-PAL No. 74, [online], Sony Corporation, [retrieved on Aug. 18, 2008], Internet <URL: http://www.sony.co.jp/Products/SC-HP/cx_pal/vol74/pdf/featuring2_bd.pdf>).

SUMMARY OF THE INVENTION

An optical disk device includes a pickup as a movable part and a signal controlling system as a fixed part. In general, a laser driving section is disposed in the vicinity of a semiconductor laser mounted on the pickup, and connection from the signal controlling system to the laser driving system is established by a flexible printed board (flexible board). Generally, a write strategy circuit is included in the signal controlling system on the drive board side as a fixed part, and a light emission timing signal for each power level is transmitted to the pickup through the flexible board.

This configuration raises the frequency of the light emission timing signal transmitted through the flexible board as recording speed is improved. At this time, a transmission band is limited by the flexible board, and intervals of the light emission timing signal cannot be transmitted accurately, which hinders improvement in recording speed. Further, a write strategy tends to become complex toward achievement of high-density and high-speed recording. Not only an increase in transfer rate but also fragmentation of pulse dividing width or an increase in the number of power levels is desired.

With the existing configuration, as the number of power levels is increased, the number of lines for laser driving control is increased, the flexible board (width of the flexible board) becomes larger, and a problem of a reduction in transmission band which problem is caused by a length for securing an arrangement space and routing occurs. When the light emission power of a laser is controlled, there occurs another problem of how to transmit a feedback signal and a sampling pulse for controlling the light emission power.

The present invention has been made in view of the above situation. It is desirable to provide a mechanism that can solve the problems of the number of signal transmissions and a reduction in transmission band when the write strategy technique is adopted. In addition, it is desirable to provide a new mechanism of a method of generating and transmitting a signal (a feedback signal and a sampling pulse) for controlling light emission power while also considering application of the write strategy technique.

According to a first form of the present invention, there is provided a laser driving device including: a sample-hold section configured to sample and hold an electric signal based on laser light emitted from a laser element; a first pulse generating section configured to generate a reference pulse indicating one of changing timing in repetition of a space and a mark and timing of changing between the space and the mark by detecting an edge of a first transmission signal indicating, by the edge, information defining timing of obtaining the reference pulse; and a second pulse generating section configured to generate a changing pulse indicating changing timing of divided power levels of respective light emission waveforms of the space and the mark and timing of a sampling pulse for sampling and holding the electric signal by detecting an edge of a second transmission signal indicating, by the edge, information defining timing of obtaining the changing pulse. The laser driving device further includes: a light emission waveform generating section configured to output reference level information as level information on a level at a position of the reference pulse, the level information being included in power level information on each power level of the light emission waveforms, for each the reference pulse, and output other level information following the reference level information in order for each the changing pulse; a storing section configured to store setting information defining a recording waveform control signal pattern indicating the power level information of the light emission waveforms for driving the laser element at the power levels of the respective light emission waveforms of the space and the mark and a pulse pattern of the sampling pulse; and a sampling pulse generating section configured to generate the sampling pulse on a basis of the setting information of the pulse pattern, the setting information being stored in the storing section, and supply the sampling pulse to the sample-hold section. In the laser driving device, the reference level information as level information on the level at the position of the reference pulse, the level information being included in the power level information of the respective light emission waveforms of the space and the mark, is read out from the storing section for each the reference pulse, and then the other information following the reference level information is read out from the storing section in order for each the changing pulse.

According to a second form of the present invention, there is provided a laser driving method including the steps of: storing setting information defining a recording waveform control signal pattern indicating power level information of light emission waveforms for driving a laser element at power levels of the respective light emission waveforms of a space and a mark and a pulse pattern of a sampling pulse for sampling and holding an electric signal based on laser light emitted from the laser element in a light emission level pattern storing section; and generating a reference pulse indicating one of changing timing in repetition of the space and the mark and timing of changing between the space and the mark by detecting an edge of a first transmission signal indicating, by the edge, information defining timing of obtaining the reference pulse. The laser driving method further includes the steps of: generating a changing pulse indicating changing timing of divided power levels of the respective light emission waveforms of the space and the mark and timing of the sampling pulse by detecting an edge of a second transmission signal indicating, by the edge, information defining timing of obtaining the changing pulse; and setting the power levels of the light emission waveforms and obtaining the sampling pulse by reading reference level information as level information on a level at a position of the reference pulse, the level information being included in the power level information of the respective light emission waveforms of the space and the mark and the setting information of the sampling pulse, the power level information of the respective light emission waveforms of the space and the mark and the setting information of the sampling pulse being stored in the light emission level pattern storing section, for each the reference pulse, and reading other information following the reference level information in order for each the changing pulse.

According to a third form of the present invention, there is provided a light device including: a laser element; a driving section configured to drive the laser element; a sample-hold section configured to sample and hold an electric signal based on laser light emitted from the laser element; an optical member for guiding the laser light emitted from the laser element; and a light emission waveform pulse generating section configured to generate a plurality of pulse signals defining light emission waveforms formed by a combination of driving signals having different levels for a space and a mark on a basis of a recording clock and recording data. The light device further includes: a transmission signal generating section configured to generate a first transmission signal indicating, by an edge, information defining timing of obtaining a reference pulse indicating one of changing timing in repetition of the space and the mark and timing of changing between the space and the mark and a second transmission signal indicating, by an edge, information defining timing of obtaining a changing pulse indicating changing timing of the light emission waveforms and timing of a sampling pulse for sampling and holding the electric signal based on the laser light emitted from the laser element on a basis of the plurality of pulse signals generated by the light emission waveform pulse generating section; and a pulse generating section including a first pulse generating section configured to generate the reference pulse on a basis of the edge of the first transmission signal, and a second pulse generating section configured to generate the changing pulse on a basis of the edge of the second transmission signal. The lighting device still further includes: a storing section configured to store a recording waveform control signal pattern indicating level information for the light emission waveforms and setting information of the sampling pulse; a light emission waveform generating section configured to read reference level information as level information on a level at a position of the reference pulse, the level information being included in power level information of the respective light emission waveforms of the space and the mark, from the storing section for each the reference pulse, and then output other information following the reference level information in order for each the changing pulse; a sampling pulse generating section configured to generate the sampling pulse on a basis of the setting information of the pulse pattern, the setting information of the pulse pattern being stored in the storing section, and supply the sampling pulse to the sample-hold section; and a transmitting member for transmitting a signal, the transmitting member being interposed between a first mounting section in which the laser element, the driving section, the sample-hold section, the optical member, the pulse generating section, the light emission waveform generating section, and the storing section are mounted and a second mounting section in which the light emission waveform pulse generating section and the transmission signal generating section are mounted.

According to a fourth form of the present invention, there is provided an optical unit including: a laser element; a driving section configured to drive the laser element; a sample-hold section configured to sample and hold an electric signal based on laser light emitted from the laser element; an optical member for guiding the laser light emitted from the laser element; and a pulse generating section including a first pulse generating section configured to generate a reference pulse on a basis of a first transmission signal indicating, by an edge, information defining timing of obtaining the reference pulse indicating one of changing timing in repetition of a space and a mark and timing of changing between the space and the mark, and a second pulse generating section configured to generate a changing pulse on a basis of a second transmission signal indicating, by an edge, information defining timing of obtaining the changing pulse indicating changing timing of the light emission waveforms and timing of a sampling pulse for sampling and holding the electric signal based on the laser light emitted from the laser element. The optical unit further includes: a storing section configured to store a recording waveform control signal pattern indicating level information for the light emission waveforms and setting information of the sampling pulse; a light emission waveform generating section configured to read reference level information as level information on a level at a position of the reference pulse, the level information being included in power level information of the respective light emission waveforms of the space and the mark, from the storing section for each the reference pulse, and then output other information following the reference level information in order for each the changing pulse; and a sampling pulse generating section configured to generate the sampling pulse on a basis of the setting information of the pulse pattern, the setting information of the pulse pattern being stored in the storing section, and supply the sampling pulse to the sample-hold section.

According to a form of the present invention, there are a small number of kinds of signals being transmitted, so that the problems of the number of transmissions and a reduction in transmission band are solved. This is because the problem caused by a length for securing a signal line arrangement space and routing is alleviated. In addition, because the timing information of the sampling pulse is superimposed on the second transmission signal, a transmission line dedicated to the sampling pulse does not need to be provided in a flexible board. Further, a storing section having setting information for the timing information of the sampling pulse superimposed on the second transmission signal is not necessary on a pickup side.

BRIEF DESCRIPTION OF THE DRAWINGS

FIG. 1B is a diagram of assistance in explaining an example of configuration of an optical pickup;

FIG. 2 is a diagram of assistance in explaining a write strategy;

FIG. 3A is a diagram showing a system configuration of a present embodiment;

FIGS. 3B to 3E are diagrams of assistance in explaining basic principles of the present embodiment to which the write strategy is applied;

FIG. 4A is a diagram of assistance in explaining a first example of setting of a sampling pulse;

FIG. 6A is a diagram of a laser driving circuit for implementing a laser driving system of the basic configuration;

FIG. 6B is a diagram of assistance in explaining relation between information stored in a memory circuit and a current switch used in the laser driving circuit of the basic configuration;

FIG. 7D is a diagram showing a laser driving circuit according to the first embodiment;

FIG. 9B is a diagram of assistance in explaining an example of configuration of a sampling pulse generating section according to the second embodiment;

FIG. 9C is a diagram of assistance in explaining operation of the sampling pulse generating section according to the second embodiment;

FIG. 10A is a diagram of assistance in explaining a first comparative example of a signal interface method;

FIG. 10B is a diagram of assistance in explaining a second comparative example of the signal interface method; and FIG. 10C is a diagram of assistance in explaining a third comparative example of the signal interface method.

DETAILED DESCRIPTION OF THE PREFERRED EMBODIMENTS

Preferred embodiments of the present invention will hereinafter be described in detail with reference to the drawings. Incidentally, description will be made in the following order.
1. Outline of Configuration of Recording and Reproducing Device
2. Problems of Signal Interface and Principles of Method as Measure
3. System Configuration of Signal Interface
4. Setting Information of Sampling Pulse
5. Basics of Sequential System
6. First Embodiment: Sequential System+Sampling Pulse Timing Superimposition
7. Example of Modification of First Embodiment: Superimposition of Only Starting Timing
8. Second Embodiment: First Embodiment+Provision for Stopping Supply of Sampling Pulse
9. Comparison with Comparative Examples <Outline of Configuration of Recording and Reproducing Device>

Figure 1A:
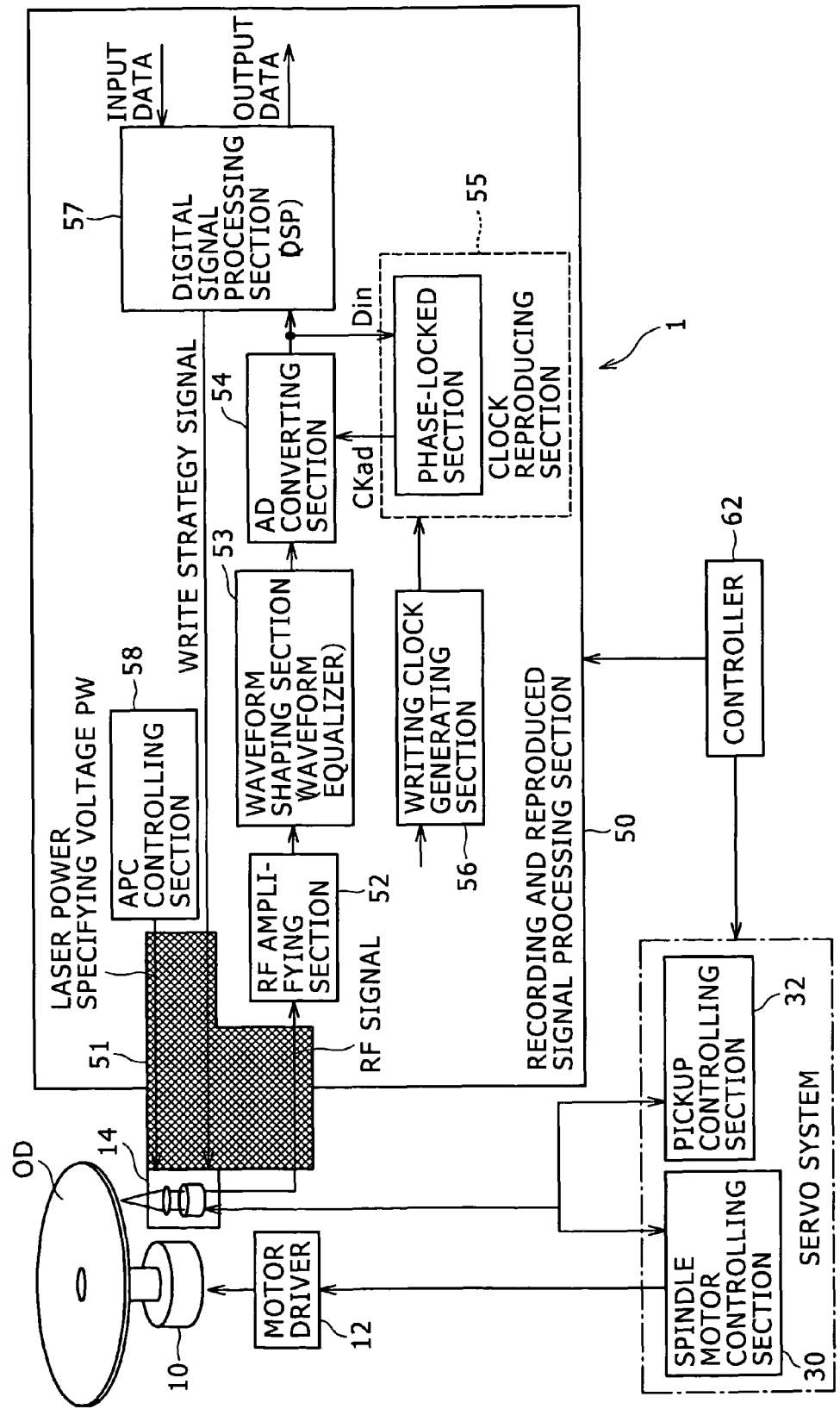
FIG. 1A is a diagram showing an example of configuration of a recording and reproducing device as an example of a light device.

FIG. 1A is a diagram showing an example of configuration of a recording and reproducing device (optical disk device) as an example of an optical device. FIG. 1B is a diagram of assistance in explaining an example of configuration of an optical pickup.

An optical disk OD may be not only a so-called reproduction-only optical disk such as a CD (Compact Disk), a CD-ROM (Read Only Memory), or the like but also for example a write-once optical disk such as a CD-R (Recordable) or the like or a rewritable optical disk such as a CD-RW (Rewritable) or the like. Further, the optical disk is not limited to CD-type optical disks, but may be an MO (magneto-optical disk), an ordinary DVD (Digital Video or Versatile Disk), or a DVD-type optical disk such as a next-generation DVD using a blue laser having a wavelength of about 405 nm, for example. A DVD system includes DVD-RAW-R/+R/-RW/+RW, for example. In addition, the optical disk may be a so-called double-density CD (DDCD; DD=Double Density), CD-R or CD-RW having a recording density about twice that of a current CD format while following the current CD format.

The recording and reproducing device 1 according to the present embodiment includes an optical pickup 14 and a pickup controlling section 32. The optical pickup 14 records information onto the optical disk OD or reproduces information on the optical disk OD. The optical pickup 14 is controlled by the pickup controlling section 32. The pickup controlling section 32 controls the radial direction position (tracking servo) of a laser beam emitted from the optical pickup 14 with respect to the optical disk OD and the focal direction position (focus servo) of the laser beam emitted from the optical pickup 14 with respect to the optical disk OD.

The recording and reproducing device 1 includes a spindle motor 10, a motor driver 12, and a spindle motor controlling section 30 as a rotation controlling section (rotation servo system). The spindle motor 10 rotates the optical disk OD. The rotational frequency of the optical disk OD is controlled by the spindle motor controlling section 30.

The recording and reproducing device 1 includes a recording and reproduced signal processing section 50 as a recording and reproducing system, the recording and reproduced signal processing section 50 being an example of an information recording section for recording information via the optical pickup 14 and an information reproducing section for reproducing information recorded on the optical disk OD. Connection between the recording and reproduced signal processing section 50 and the optical pickup 14 is established via signal wiring that is pattern-formed in a flexible board 51 as an example of a transmitting member for transmitting a signal. The overall length of the flexible board 51, which overall length differs depending on the arrangement of the recording and reproduced signal processing section 50 and the optical pickup 14, is about 100 mm, for example.

The recording and reproducing device 1 includes a controller 62, an interface section performing an interface function, the interface section being not shown in the figure, and the like as a controller system. The controller 62 is formed by a microprocessor (MPU: Micro Processing Unit). The controller 62 controls the operation of a servo system having the spindle motor controlling section 30 and the pickup controlling section 32 and the recording and reproduced signal processing section 50. The interface section performs a function of an interface (connection) with a personal computer (hereinafter referred to as a PC), which is an example of an information processing device (host device) performing various information processing using the recording and reproducing device 1. The interface section is provided with a host IF controller. The recording and reproducing device 1 and the PC form an information recording and reproducing system (optical disk system).

[Optical Pickup]

As shown in FIG. 1B, the optical pickup 14 includes a semiconductor laser 41, a beam splitter 42, a lens 43, a mirror 44, a light detecting section 45, and a driving current controlling section 47 as an example of a laser driving device. The driving current controlling section 47 is formed by a laser driving IC (LDD), for example. A recording pulse according to a write strategy is transmitted from a digital signal processing section 57 in the recording and reproduced signal processing section 50 to the driving current controlling section 47 via the flexible board 51, and a laser power specifying voltage PW is transmitted from an APC controlling section 58 to the driving current controlling section 47 via the flexible board 51. The driving current controlling section 47 generates a recording waveform by synthesizing the recording pulse according to the write strategy and the laser power specifying voltage PW for APC control, amplifies the recording waveform, and drives the semiconductor laser 41.

The semiconductor laser 41 emits laser light for recording additional information onto the optical disk OD or reading information recorded on the optical disk OD. The beam splitter 42 transmits or reflects the laser light from the semiconductor laser 41 or reflected light from the optical disk OD. The mirror 44 reflects the laser light or the reflected light in a direction of about 90 degrees.

The light detecting section 45 has a first light detecting section 45a and a second light detecting section 45b. The first light detecting section 45a, for example, is formed by a photodetector IC (PDIC). The second light detecting section 45b is formed by a front monitor photodetector IC (FMPDIC), for example. The first light detecting section 45a obtains an RF signal for reproduced signal processing (including servo processing). The second light detecting section 45b obtains a power monitor signal PM for APC control. Though not shown in the figure, the first light detecting section 45a and the second light detecting section 45b each have a light receiving element, a current/voltage converting section, and an amplifying section. As will be described later in detail, the second light detecting section 45b according to the present embodiment also has a sample-hold circuit for sampling and holding the power monitor signal PM output from the amplifying section and obtaining a power monitor voltage PD.

For example, the laser light emitted from the semiconductor laser 41 passes through a lens 43a and the beam splitter 42, is reflected to the optical disk OD side by a mirror 44a, is condensed by a lens 43b, and then irradiates the optical disk OD. The reflected light (laser light) reflected by the optical disk OD passes through the lens 43b, is reflected to the beam splitter 42 side by the mirror 44a, reflected to a mirror 44b side by the beam splitter 42, and further reflected by the mirror 44b, and then enters the first light detecting section 45a. The first light detecting section 45a converts this incident light into an electric signal, amplifies the electric signal, and thereby obtains an RF signal. The RF signal is transmitted to the recording and reproduced signal processing section 50 via the flexible board 51.

A part of the laser light emitted from the semiconductor laser 41 is reflected to the second light detecting section 45b side by the beam splitter 42, and then enters the second light detecting section 45b. The second light detecting section 45b converts the incident light into an electric signal, amplifies the electric signal, and thereby obtains a power monitor signal PM. Further, the second light detecting section 45b samples and holds the power monitor signal PM and thereby obtains a power monitor voltage PD. The power monitor voltage PD is transmitted to the APC controlling section 58 in the recording and reproduced signal processing section 50 via the flexible board 51.

[Recording and Signal Processing Section]

The recording and reproduced signal processing section 50 includes an RF amplifying section 52, a waveform shaping section 53 (waveform equalizer), and an AD converting section 54 (ADC; Analog-to-Digital Converter). In addition, the recording and reproduced signal processing section 50 includes a clock reproducing section 55, a writing clock generating section 56, a digital signal processing section 57 formed by a DSP (Digital Signal Processor), and an APC controlling section 58 (Automatic Power Control).

The RF amplifying section 52 amplifies a minute RF (high-frequency) signal (reproduced RF signal) read by the optical pickup 14 to a predetermined level. The waveform shaping section 53 shapes the reproduced RF signal output from the RF amplifying section 52. The AD converting section 54 converts the analog reproduced RF signal output from the waveform shaping section 53 into digital reproduced RF data Din.

The clock reproducing section 55 has a data recovery type phase-locked circuit (PLL circuit) for generating a clock signal synchronous with the reproduced RF data Din output from the AD converting section 54. In addition, the clock reproducing section 55 supplies the reproduced clock signal as an AD clock CKad (sampling clock) to the AD converting section 54, and supplies the reproduced clock signal to other functional parts.

The digital signal processing section 57 for example includes a data detecting section and a demodulation processing section as a functional part for reproduction. The data detecting section performs processing such as PRML (Partial Response Maximum Likelihood) and the like, and thereby detects digital data from the reproduced RF data Din.

The demodulation processing section performs digital signal processing such for example as demodulating a digital data string and decoding digital audio data and digital video data and the like. For example, the demodulation processing section has a demodulating section, an error correcting code (ECC) correcting section, an address decoding section and the like. The demodulation processing section performs demodulation and ECC correction as well as address decoding. The data after the demodulation is transferred to the host device via the interface section.

The writing clock generating section 56 generates a writing clock for modulating data at a time of recording onto the optical disk OD on the basis of a reference clock supplied from a crystal oscillator or the like. The digital signal processing section 57 has an ECC encoding section and a modulation processing section as a functional part for recording. The digital signal processing section 57 generates recording data, and further generates a light emission timing signal for each power level according to the write strategy.

The recording and reproducing device 1 according to the present embodiment records digital data output from an information source onto an optical disk OD and reproduces information recorded on the optical disk OD by laser light applied from the semiconductor laser 41. The driving current controlling section 47 supplies a driving current according to the write strategy to the semiconductor laser 41. The APC controlling section 58 has a function of controlling the light emission power of the semiconductor laser 41 to a fixed level on the basis of a power monitor voltage PD. The APC controlling section 58 supplies a laser power specifying voltage PW to the driving current controlling section 47 of the optical pickup 14.

<Problems of Signal Interface and Principles of Method as Measure>

FIG. 2 is of assistance in explaining problems of a signal interface and basic principles of a method as a measure against the problems, and is specifically a diagram of assistance in explaining an example of a laser driving system to which a write strategy technique is applied.

As an optical disk recording system, a so-called light intensity modulating system that forms marks and spaces on the recording medium by changing the strength of optical power when recording information onto the optical recording medium is adopted to perform recording. In order to perform recording with fewer errors, a waveform as shown in FIG. 2, for example, is used for changing the strength of the optical power, rather than recoding data itself.

A multi-pulse system divides a recording clock, and effects pulse light emission. In this example, the multi-pulse system has three power levels of Cool, Erase, and Peak. A castle system is used mainly in high-speed recording. The castle system does not effect pulse light emission in recording clock units, but increases laser power at a start and an end of a mark. In this example, the castle system has four power levels of Cool, Erase, Peak, and Over Drive, which number is increased as compared with the multi-pulse system. In addition, timing of each edge is adjusted in a unit smaller than a channel clock interval (Tw). For example, the unit is Tw/40, Tw/32, Tw/16 or the like. The device of this light emission pattern is referred to as a recording compensation (write strategy technique), and a recording compensation circuit (write strategy circuit) generates the timing of each edge according to recording data.

In each of the following embodiments, description will be made of a case where the castle system is applied to laser light emission waveforms unless otherwise specified. This is because the castle system is common in high-speed recording. However, the mechanism of each of the embodiments to be described later is also applicable to the multi-pulse system. This is because the castle system and the multi-pulse system differ from each other only in set value of a power level in timing of each pulse and have a commonality in that "recording power is pulse-divided, converted to multivalued levels, and controlled."

On the other hand, for example, a laser driving system 3 of an optical disk device is divided into an optical pickup 14 (optical head) including a semiconductor laser 41 and optical parts and a drive board including a control circuit (see FIG. 1B). Because the optical pickup 14 is movable along the radius of the optical disk OD, the optical pickup 14 and the drive board are connected to each other by a flexible board 51.

The present embodiment first has a mechanism capable of solving the problems of the number of transmissions and the transmission band of signal lines in application of the write strategy technique without increasing the circuit scale of the laser driving circuit. A basic idea of the method is first to store the power level information (recording waveform control signal pattern) of laser light emission in each timing when the write strategy technique is applied, on the side of the optical pickup 14 (for example a laser driving circuit 200). In addition, a first transmission signal including information defining timing of obtaining a reference pulse indicating changing timing in repetition of spaces and marks and a second transmission signal including information defining timing of obtaining a changing pulse indicating changing timing of laser light emission levels are used. The first transmission signal and the second transmission signal are treated as the write strategy signal in FIGS. 1A and 1B. Incidentally, the reference pulse may be regarded as indicating changing timing of laser light emission levels, and a method treating the reference pulse as one mode of the changing pulse may be adopted.

As for a recording system, the reference pulse and the changing pulse are generated from two kinds of pulse signals, the initial level of a recording waveform control signal pattern is set for the reference pulse, and thereafter a light emission power level to which the write strategy technique is applied is selected according to the recording waveform control signal pattern for each changing pulse. Then, each time the reference pulse is generated, the same process as described above is performed again. Such a system is referred to as a sequential system in the present specification.

The sequential system has a commonality with a previous mechanism (referred to as an ordinary system) in that the write strategy circuit 290 is mounted on the drive board side. However, the sequential system has a feature of requiring fewer kinds of signal transmission lines via the flexible board 51.

In addition, the present embodiment has a mechanism capable of solving the problems of signal transmission at high frequencies and the number of signal lines in a method of generating and transmitting a feedback signal for APC control and a sampling pulse SP. A basic idea of the method has a feature of also transmitting the timing signal of the sampling pulse SP by the sequential system in addition to the two kinds of pulse signals for the write strategy. The sampling pulse is also superimposed on the sequential system for the write strategy. The optical pickup 14 side sets light emission power levels by generating. (reproducing) the two kinds of pulse signals for the write strategy, generates (reproduces) the timing signal of the sampling pulse, and obtains the sampling pulse by delaying the timing signal by a necessary amount according to an actual condition.

<System Configuration of Signal Interface>

FIGS. 3A to 3E are diagrams of assistance in explaining a signal interface system according to the present embodiment. FIG. 3A is a diagram showing a system configuration for implementing the signal interface system according to the present embodiment. FIGS. 3B to 3E are diagrams of assistance in explaining basic principles of a laser driving system according to the present embodiment to which the write strategy technique is applied.

In the configuration of the present embodiment, the write strategy circuit 290 is disposed on the drive board side and the transmission signal generating section 500 is disposed in a stage following the write strategy circuit 290. The transmission signal generating section 500 receives a recording waveform control signal pattern signal from the write strategy circuit 290, converts the recording waveform control signal pattern signal into two kinds of pulse signals for the write strategy (transmission signals of the sequential system), and transmits the signals to the optical pickup 14 side via the flexible board 51. At this time, as will be described later in detail, the timing signal of the sampling pulse for APC control is also superimposed on the transmission signals of the sequential system, thereby eliminating a need to provide a separate transmission line dedicated to the sampling pulse SP.

In addition, directing attention to an APC controlling system, in the configuration of the present embodiment, a sample-hold section 330 is housed in a power monitoring circuit 300 on the optical pickup 14 side rather than on the drive board (recording and reproduced signal processing section 50) side. The power monitoring circuit 300 includes a light receiving element 310, a current-voltage converting section 313 (I-V), a variable gain type amplifying section 315 (GCA), the sample-hold section 330, and an output buffer 340. The light receiving element 310 and the current-voltage converting section 313 form a photoelectric converting section.

The current-voltage converting section 313 is a differential input-differential output type. The current-voltage converting section 313 generates differential power monitoring signals PM_P and PM_N by converting a current signal obtained by photoelectric conversion in the light receiving element 310 into a voltage signal. The current-voltage converting section 313 supplies the differential power monitoring signals PM_P and PM_N to the amplifying section 315. The amplifying section 315 is a differential input-differential output type. The amplifying section 315 amplifies the power monitoring signals PM_P and PM_N, and supplies the amplified power monitoring signals PM_P and PM_N to the sample-hold section 330.

A sample-hold circuit 332 has a sample-hold circuit 332_P for sampling and holding the non-inverted power monitoring signal PM_P and a sample-hold circuit 332_N for sampling and holding the inverted power monitoring signal PM_N. A sample-hold circuit 334 has a sample-hold circuit 334_P for sampling and holding the non-inverted power monitoring signal PM_P and a sample-hold circuit 334_N for sampling and holding the inverted power monitoring signal PM_N.

The output buffer 340 has an output buffer 342 for a power monitoring voltage PD_1 and an output buffer 344 for a power monitoring voltage PD_2. The output buffers 342 and 344 are a differential input-single-ended output type. The output buffer 342 generates the power monitoring voltage PD_1 on the basis of a power monitoring voltage PD_P1 from the sample-hold circuit 332_P and a power monitoring voltage PD_N1 from the sample-hold circuit 332_N. The output buffer 342 supplies the power monitoring voltage PD_1 to the APC controlling section 58. The output buffer 344 generates the power monitoring voltage PD_2 on the basis of a power monitoring voltage PD_P2 from the sample-hold circuit 334_P and a power monitoring voltage PD_N2 from the sample-hold circuit 334_N. The output buffer 344 supplies the power monitoring voltage PD_2 to the APC controlling section 58. The power monitoring voltages PD_1 and PD_2 are sent as a feedback signal for APC to the APC controlling section 58 via the flexible board 51.

A sampling pulse generating section 400 generates sampling pulses SP_1 and SP_2 on the basis of a write strategy signal (2 to 3 ch) of the sequential system enabling LVDS which signal is transmitted from the recording and reproduced signal processing section 50 via the flexible board 51. In this case, the sampling pulse SP_1 is for a mark, and the sampling pulse SP_2 is for a space.

The sampling pulse generating section 400 may be disposed within either of the laser driving circuit 200 and the power monitoring circuit 300, or may be disposed separately from the laser driving circuit 200 and the power monitoring circuit 300.

The sampling pulse generating section 400 has a sampling pulse pattern storing section 430V storing setting information (pulse pattern) at a time of generating the sampling pulse SP. The present embodiment needs at least a delay time as setting information (information defining a pulse pattern). In a preferable mode, setting information for turning on/off a timing signal for the sampling pulse SP obtained on the basis of the laser driving timing signal of the sequential system for a mark and a space separately is also included. In other words, at least setting information defining a starting point and an ending point or pulse width of the sampling pulse SP does not need to be stored in the sampling pulse pattern storing section 430V.

As shown in FIG. 3D, the sequential system generates a reset pulse RP as a reference pulse and an edge pulse EP as a changing pulse using two kinds of input signals, that is, a reset signal RS as a first transmission signal and an edge signal ES as a second transmission signal;

The first transmission signal (reset signal RS) indicates the same edge as a start edge (edge pulse EP1 in FIG. 3C) of the recording waveform control signal pattern in the laser driving circuit 200Y of the second comparative example, the laser driving circuit 200Y including a write strategy circuit. The second transmission signal (edge signal ES) indicates the same edges as obtained by synthesizing other edge timing (edge pulses EP2, EP3, EP4, and EP5 in FIG. 3C).

As shown in FIG. 3E, information on each light emission power level indicating a recording waveform control signal pattern is stored in order in each register of a memory circuit. The information on a reference power level is read out on the basis of the reset pulse RP. The information on a light emission power level in each timing following the information on the reference power level is read out in order on the basis of the edge pulse EP.

That is, a sequential access memory having a reset function operating at high speed is provided within the laser driving circuit 200, and each piece of power level information is retained in order of readout. Then, each time a changing pulse (edge pulse EP) is generated, the information on a light emission power level is selected and read out in order from information next to the information on the reference power level. Further, regardless of which light emission power level is selected, by the reset function of the reference pulse (reset pulse RP), the information of a first area (information on the reference power level) is read out in timing of generation of the reference pulse.

As shown in FIGS. 3B and 3E, of the edge pulses EP1 to EP5 defining the recording waveform control signal pattern generated in the write strategy circuit 290, the edge pulse EP1 corresponds to the reset pulse RP. Accordingly, the transmission signal generating section 500 generates the reset signal RS on the basis of the edge pulse EP1. In addition, because the edge pulses EP2 to EP5 correspond to the edge pulse EP, the transmission signal generating section 500 generates the edge signal ES on the basis of the edge pulses EP2 to EP5.

At this time, an idea of defining the reset pulse RP by one edge of the reset signal RS and an idea of defining the reset pulse RP by both edges of the reset signal RS can both be adopted. Similarly, an idea of defining the edge pulse EP by one edge of the edge signal ES and an idea of defining the edge pulse EP by both edges of the edge signal ES can both be adopted. The frequency of output of the edge pulse EP is higher than that of the reset pulse RP. Accordingly, in the present embodiment, at least the edge pulse EP is defined by both edges of the edge signal ES.

In the following, description will first be made of a basic mechanism of the sequential system in order to facilitate understanding of mechanisms of the present embodiment, and thereafter concrete mechanisms of the present embodiment will be described.

<Setting information of Sampling Pulse>

Figure 4B:
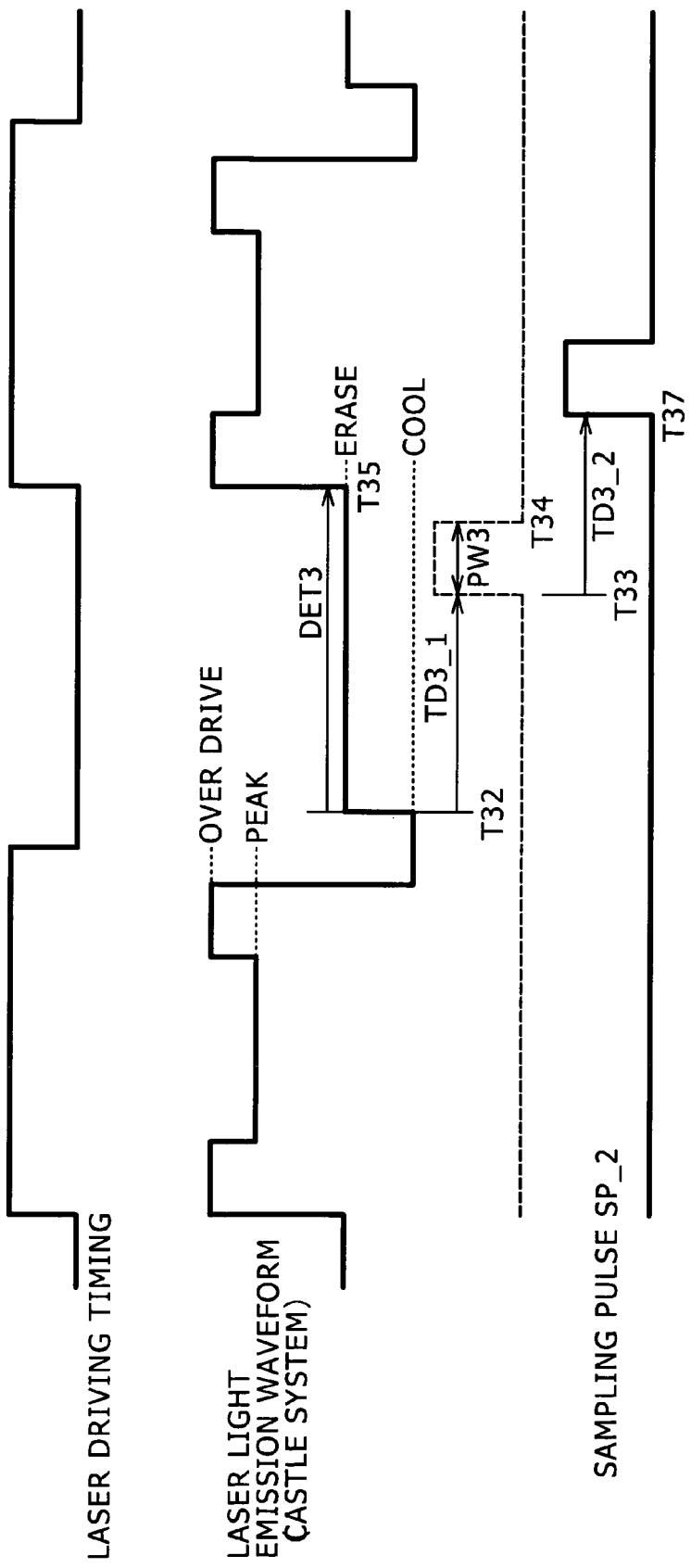
FIG. 4B is a diagram of assistance in explaining a second example of setting of a sampling pulse.

FIGS. 4A and 4B are diagrams for explaining the setting information of sampling pulse SP.

Sampling Pulse Setting

First Example

The first setting example shown in FIG. 4A sets a sampling pulse SP_1 for a mark (=mark gate MG). A laser light emission waveform has four power levels of Cool, Erase, Peak, and Over Drive. It can be considered that of the four power levels, power levels for forming a mark are Peak and Over Drive, and power levels for forming a space are Cool and Erase.

As for the sampling pulse SP_1 for a mark which pulse is supplied to a sample-hold circuit 332, a delay time from an edge as a starting point for forming the mark, a pulse width, and an overall delay time for delay compensation up to the sample-hold circuit 332 are setting information.

Description in the following will be made of a case where of Peak and Over Drive for forming the mark, the Peak level having a relatively wide width is sampled and held by the sampling pulse SP_1. The sampling pulse SP_1 is to sample and hold the Peak level of a power monitor signal PM. Thus, timing is set such that the power monitor signal PM can be sampled after becoming statically determinate from the Over Drive level to the Peak level. It is thus desirable to generate the sampling pulse SP_1 with a starting position of the Peak level as a reference because the effect of space width is eliminated. In setting the timing of sampling the Peak level, compensation for the signal band and delay of a signal path from the pulse generating section 202 to the sample-hold circuit 332 is taken into consideration.

For example, when the castle system is applied, as shown in FIG. 4A, timing T12 of a start of the Peak level is preferably set as an edge of a starting point (reference edge) for sampling the Peak level. With the reference edge T12 as a starting point, a rising edge delay time TD1_1 (T12 to T13) defining the rising edge timing T13 of the sampling pulse SP_1 is setting information. The rising edge delay time TD1_1 is preferably set in consideration of a time for the power monitoring signal PM input to the sample-hold circuit 332 to become statically determinate from the Over Drive level to the Peak level. Further, with the rising edge timing T13 as a starting point, a pulse width PW1 (T13 to T15) defining the period of the active H of the sampling pulse SP_1 and a pulse delay time TD1_2 (T13 to T16) taken for the sampling pulse SP_1 to actually become the active H are other setting information. The pulse delay time TD1_2 is preferably set in consideration of making compensation for a difference between the delay time of the sampling pulse in a signal path from the pulse generating section 202 to the sample-hold circuit 332 and the delay time of the power monitoring signal PM.

The delay time of the sampling pulse is a time taken for the sampling pulse to be input from the pulse generating section 202 through the sampling pulse generating section 400 to the sample-hold circuit 332. The delay time of the power monitoring signal PM is a time taken for the semiconductor laser 41 to emit light in response to a signal input from the pulse generating section 202 through a light emission waveform generating section 203 to the semiconductor laser 41 and for the light to be made incident on the light receiving element 310 and input to the sample-hold circuit 332 through the current-voltage converting section 313 and the variable gain type amplifier 315. Overall, the sampling pulse SP_1 is a pulse signal such as rises after the passage of "TD1_1+TD1_2" from the timing T12 and falls after the passage of the pulse width PW1.

Incidentally, in a case of a short mark having a short mark length, it is preferable to provide also setting information for not supplying the sampling pulse SP_1 for the mark to the sample-hold circuit 332. For example, a period from the reference edge T12 to timing T14 of a start of the Over Drive, which is an end of the Peak level, is set as a sampling pulse output determination setting period DET1. When the sampling pulse output determination setting period DET1 does not reach a predetermined value, the sampling pulse SP_1 is not output.

For example, for the waveform of the power monitoring signal PM which waveform takes 10 ns to become statically determinate from the Over Drive level to the Peak level, the rising edge delay time TD1_1 is set at 10 ns or more. Thereby a correct Peak level can be sampled and held. At this time, the sampling pulse output determination setting period DET1 is set at 10 ns. Thereby the sampling pulse SP_1 is not supplied to the sample-hold circuit 332 for the pulse of the Peak level having a width of less than 10 ns.

Sampling Pulse Setting

Second Example

The second setting example shown in FIG. 4B sets a sampling pulse SP_2 for a space (=space gate SG). A laser light emission waveform has the same power levels as in FIG. 4A.

The generation of the sampling pulse SP_2 for a space is as follows, and is similar to that for a mark. As for the sampling pulse SP_2 for a space, a delay time from an edge as a starting point for forming the space, a pulse width, and an overall delay time for delay compensation up to the sample-hold circuit 334 are setting information.

Description in the following will be made of a case where of Cool and Erase for forming the space, the Erase level having a relatively wide width is sampled and held by the sampling pulse SP_2. The sampling pulse SP_2 is to sample and hold the Erase level of a power monitor signal PM. Thus, timing is set such that the power monitor signal PM can be sampled after becoming statically determinate from the Cool level to the Erase level. It is thus desirable to generate the sampling pulse SP_2 with a starting position of the Erase level as a reference because the effect of mark width is eliminated. In setting the timing of sampling the Erase level, compensation for the signal band and delay of a signal path from the pulse generating section 202 to the sample-hold circuit 334 is taken into consideration.

For example, when the castle system is applied, as shown in FIG. 4B, timing T32 of a start of the Erase level is set as an edge of a starting point (reference edge) for sampling the Erase level. With the reference edge T32 as a starting point, a rising edge delay time TD3_1 (T32 to T33) defining the rising edge timing T33 of the sampling pulse SP_2 is setting information. The rising edge delay time TD3_1 is preferably set in consideration of a time for the power monitoring signal PM input to the sample-hold circuit 334 to become statically determinate from the Cool level to the Erase level. Further, with the rising edge timing T33 as a starting point, a pulse width PW3 (T33 to T34) defining the period of the active H of the sampling pulse SP_2 and a pulse delay time TD3_2 (T33 to T37) taken for the sampling pulse SP_2 to actually become the active H are other setting information. The pulse delay time TD3_2 is preferably set in consideration of making compensation for a difference between the delay time of the sampling pulse in a signal path from the pulse generating section 202 to the sample-hold circuit 334 and the delay time of the power monitoring signal PM. Thus, the sampling pulse SP_2 rises after the passage of "TD3_1+TD3_2" from the timing T32, and falls after the passage of the pulse width PW3.

Incidentally, in a case of a short space having a short space length, it is preferable to provide also setting information for not supplying the sampling pulse SP_2 for the space to the sample-hold circuit 332. For example, a period from the reference edge T32 to timing T35 of a start of the Over Drive, which is an end of the Erase level, is set as a sampling pulse output determination setting period DET3. When the sampling pulse output determination setting period DET1 does not reach a predetermined value, the sampling pulse SP_2 is not output.

For example, for the waveform of the power monitoring signal PM which waveform takes 10 ns to become statically determinate from the Cool level to the Erase level, the rising edge delay time TD3_1 is set at 10 ns or more. Thereby a correct Erase level can be sampled and held. At this time, the sampling pulse output determination setting period DET3 is set at 10 ns. Thereby the sampling pulse SP_2 is not supplied to the sample-hold circuit 332 for the pulse of the Erase level having a width of less than 10 ns.

<Basics of Sequential System>

Figure 5A:
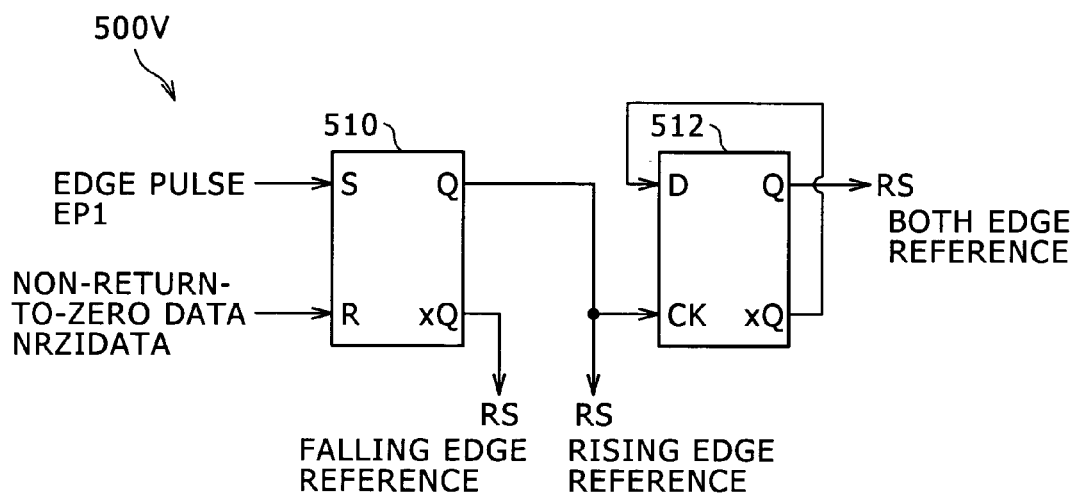
FIGS. 5A and 5B are diagrams showing a transmission signal generating section of a basic configuration.
Figure 5B:
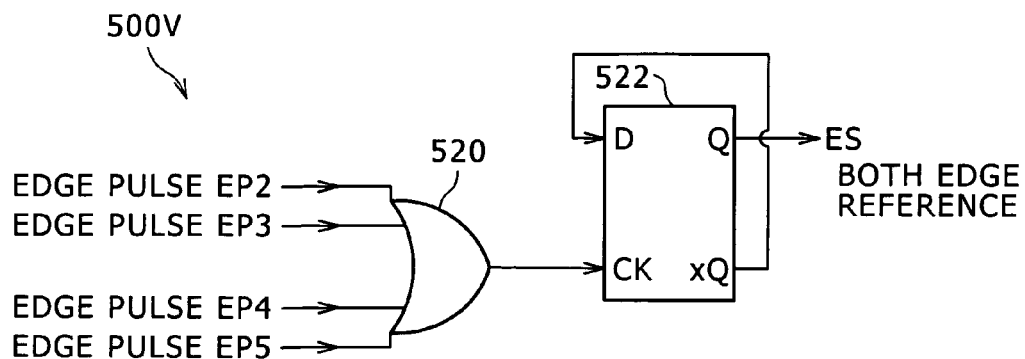
Figure 5C:
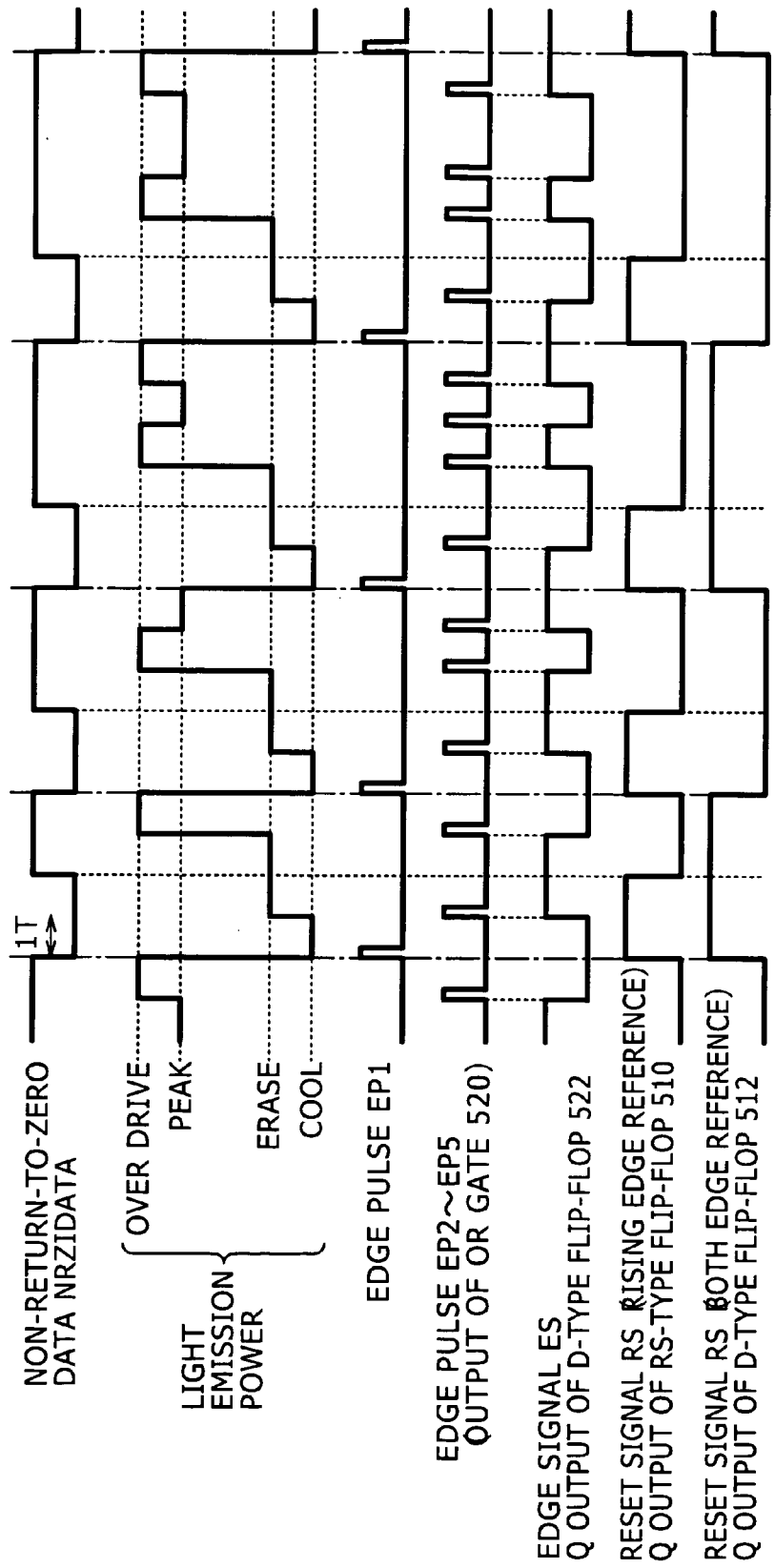
FIG. 5C is a diagram of assistance in explaining operation of the transmission signal generating section of the basic configuration.
Figure 6A:
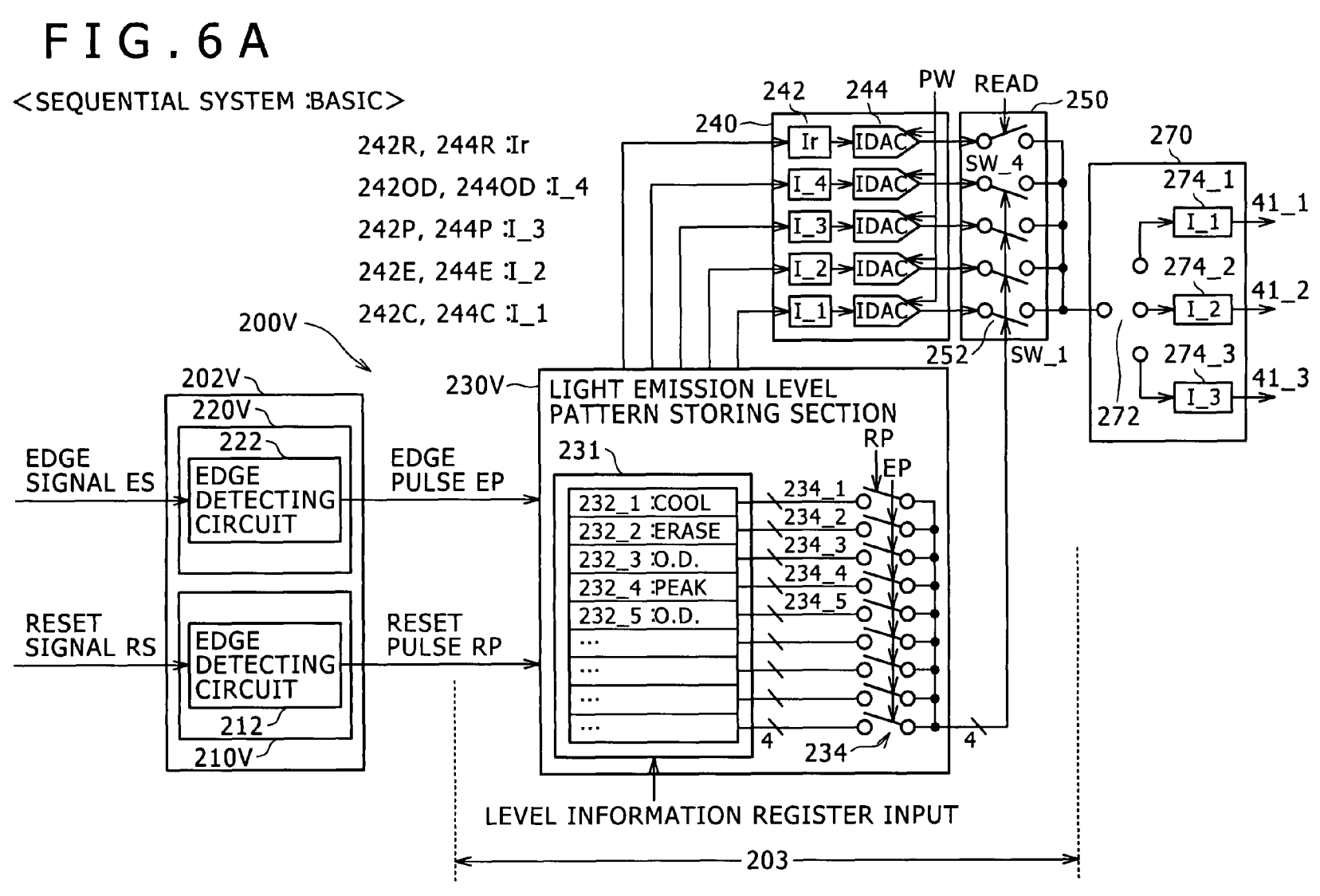
Figure 6C:
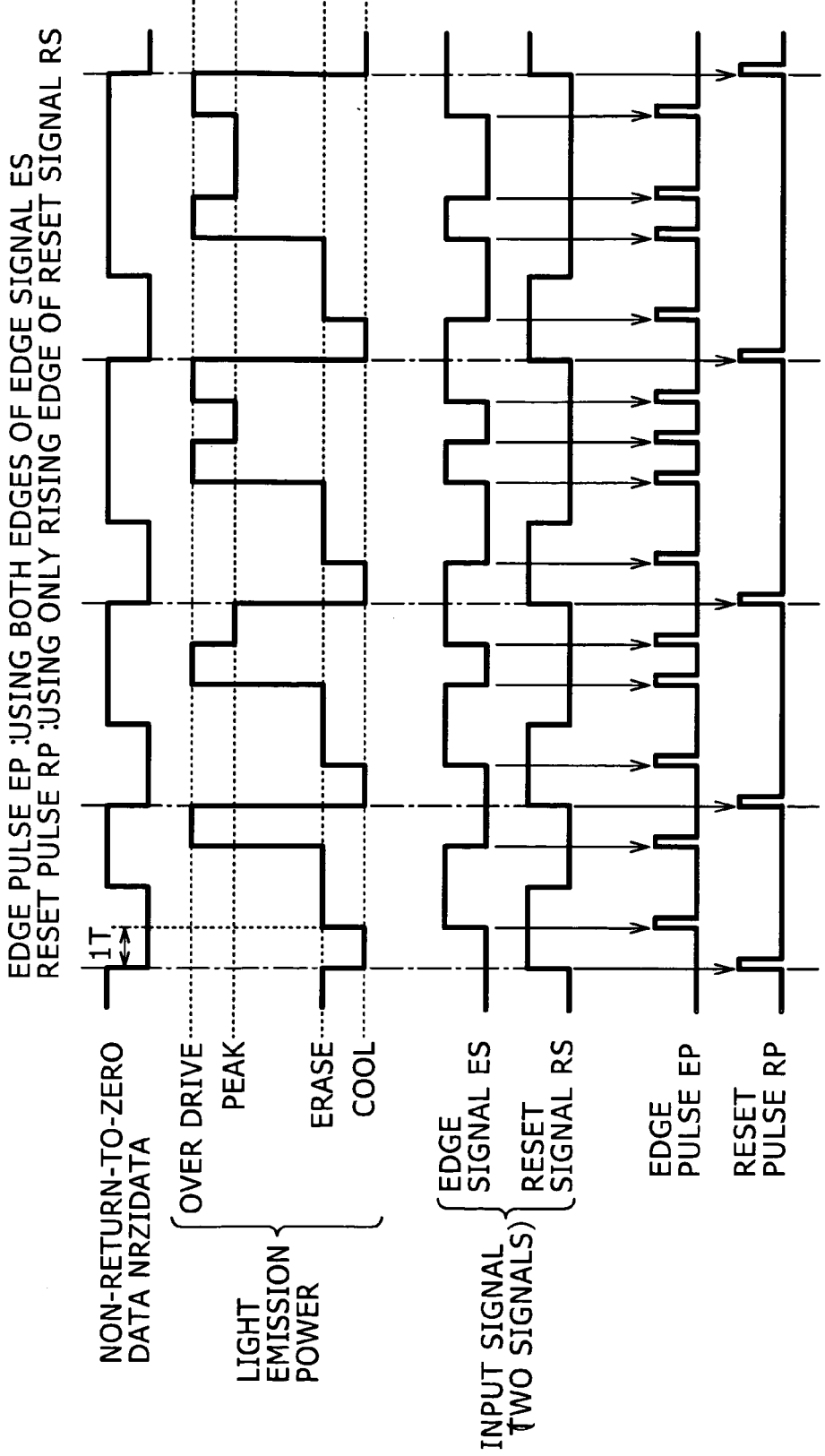
FIG. 6C is a diagram (first example) of assistance in explaining operation of the laser driving circuit of the basic configuration.
Figure 6D:
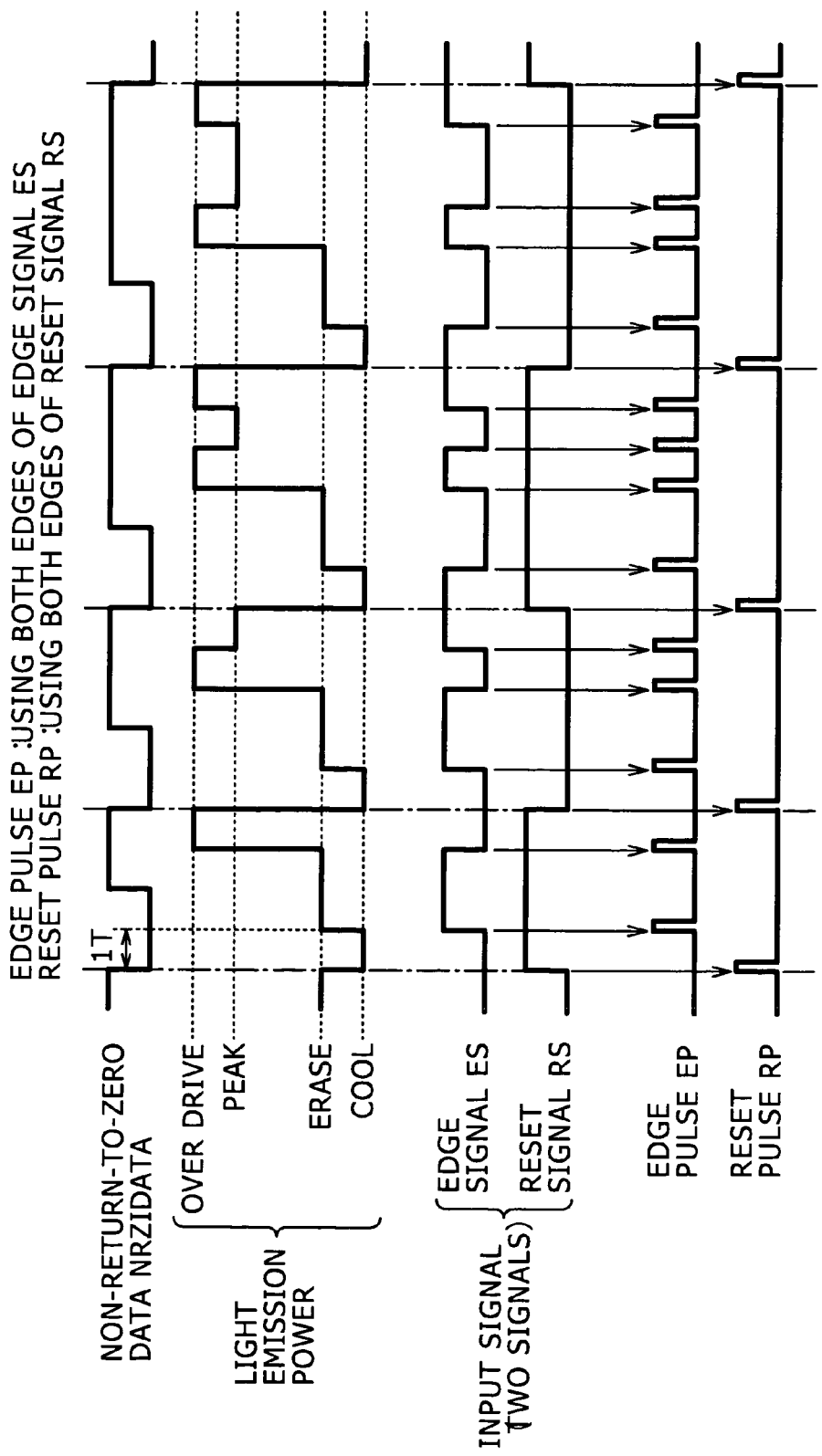
FIG. 6D is a diagram (second example) of assistance in explaining operation of the laser driving circuit of the basic configuration.
Figure 6E:
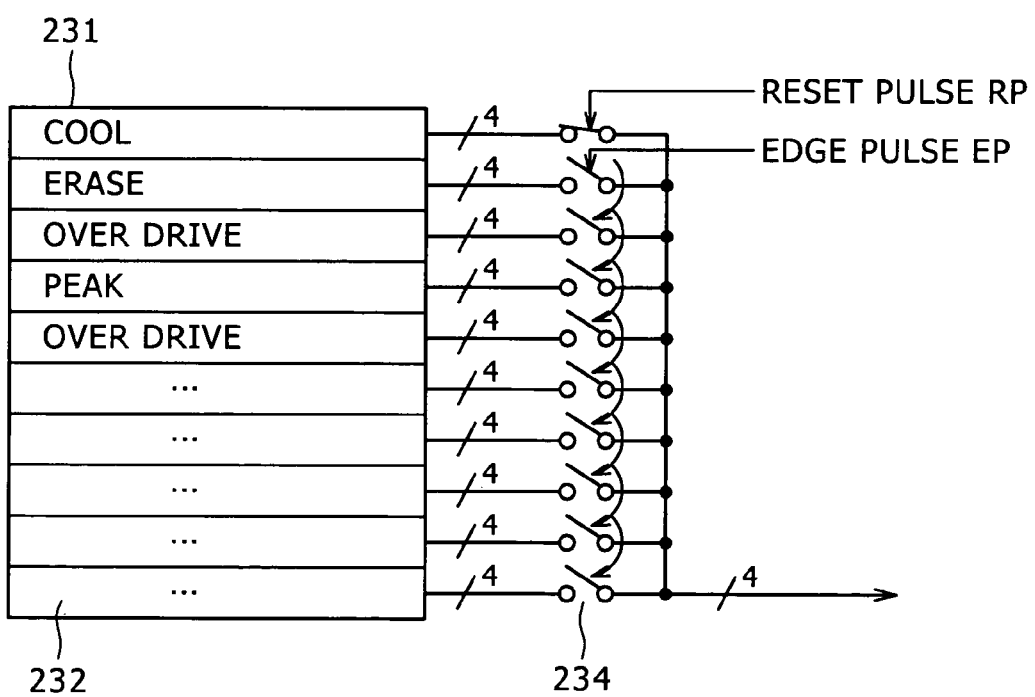
FIG. 6E is a diagram of assistance in explaining register setting information of power levels of the basic configuration.

FIGS. 5A to 6E are diagrams of assistance in explaining a basic mechanism of a laser driving system employing the sequential system. FIGS. 5A and 5B are diagrams of assistance in explaining an example of basic configuration of a transmission signal generating section 500V provided in a digital signal processing section 57 on a drive board side for implementing the sequential system. FIG. 5C is a diagram of assistance in explaining operation of the transmission signal generating section 500V of the basic configuration. FIG. 6A is a diagram of assistance in explaining an example of basic configuration of a laser driving circuit 200V (corresponding to the driving current controlling section 47 in FIG. 1B in particular). FIG. 6B is a diagram of assistance in explaining relation between information stored in a memory circuit (light emission level pattern storing section) used in the laser driving circuit of the basic configuration and current switches. FIG. 6C and FIG. 6D are diagrams of assistance in explaining the operation of the laser driving circuit 200V of the basic configuration. FIG. 6E is a diagram of assistance in explaining register setting information of the memory circuit corresponding to a recording waveform control signal pattern shown in FIG. 6C and FIG. 6D.

The basic configuration in a recording mode supplies one first transmission signal and one second transmission signal to a laser driving circuit 200V, and drives a semiconductor laser 41 by the write strategy technique. As the first transmission signal, a reset signal RS indicating, by an edge, timing of obtaining a reference pulse indicating changing timing in repetition of spaces and marks is used. As the second transmission signal, an edge signal ES indicating, by an edge, timing of obtaining a changing pulse indicating timing of changing laser light emission level is used.

[Circuit Configuration: Transmission Signal Generating Section]

As shown in FIGS. 5A and 5B, the transmission signal generating section 500V on the drive board side has an RS-type flip-flop 510 and a D-type flip-flop 512 to generate a reset signal RS. Non-return-to-zero data NRZIDATA is input to the R-input terminal of the RS-type flip-flop 510, and an edge pulse EP1 is input to the S-input terminal of the RS-type flip-flop 510. The non-inverting output terminal Q of the RS-type flip-flop 510 is connected to the clock input terminal CK of the D-type flip-flop 512. The inverting output terminal xQ of the D-type flip-flop 512 is connected to the D-input terminal of the D-type flip-flop 512, so that a ½ frequency divider circuit is formed. An example of operation of the transmission signal generating section 500V is shown in FIG. 5C.

The non-inverting output terminal Q of the RS-type flip-flop 510 is set to an active H in synchronism with a rising edge of the edge pulse EP1, and is set to an inactive L in synchronism with a rising edge of the non-return-to-zero data NRZIDATA. The output pulse of the non-inverting output terminal Q of the RS-type flip-flop 510 is supplied to the clock input terminal CK of the D-type flip-flop 512 to be frequency-divided into ½.

Supposing that the output pulse of the non-inverting output terminal Q of the RS-type flip-flop 510 is the reset signal RS, a reset pulse RP is defined by a rising edge of the reset signal RS. Supposing that the output pulse of the inverting output terminal xQ of the RS-type flip-flop 510 is the reset signal RS, a reset pulse RP is defined by a falling edge of the reset signal RS. Supposing that the output pulse of the non-inverting output terminal Q or the inverting output terminal xQ of the D-type flip-flop 512 is the reset signal RS, a reset pulse RP is defined by both edges of the reset signal RS. Thus, a system configuration that defines a reset pulse RP by one edge of the reset signal RS does not need the D-type flip-flop 512.

In addition, the transmission signal generating section 500V has a four-input type OR gate 520 and a D-type flip-flop 522 to generate an edge signal ES. Edge pulses EP2 to EP5 are supplied to respective input terminals of the OR gate 520. The output terminal of the OR gate 520 is connected to the clock input terminal CK of the D-type flip-flop 522. The inverting output terminal xQ of the D-type flip-flop 522 is connected to the D-input terminal of the D-type flip-flop 522, so that a ½ frequency divider circuit is formed.

Thus, the non-inverting output terminal Q or the inverting output terminal xQ of the D-type flip-flop 522 is changed to an L or an H in order in synchronism with a rising edge of one of the edge pulses EP2 to EP5.

Hence, supposing that the output pulse of the non-inverting output terminal Q or the inverting output terminal xQ of the D-type flip-flop 522 is the edge signal ES, an edge pulse EP is defined by both edges of the edge signal ES.

[Circuit Configuration: Laser Driving Circuit]

As shown in FIG. 6A, a laser driving circuit 200V of a basic configuration includes a pulse generating section 202V having a reset pulse generating section 210V and an edge pulse generating section 220V, a light emission level pattern storing section 230V, a current source section 240, a current switch section 250, and a laser driving section 270. The reset pulse generating section 210V is an example of a first pulse generating section. The edge pulse generating section 220V is an example of a second pulse generating section.

Parts excluding the pulse generating section 202V and the laser driving section 270 in the laser driving circuit 200V correspond to a recording waveform generating section. The laser driving circuit 200V is supplied with a reset signal RS as a first transmission signal and an edge signal ES as a second transmission signal from a transmission signal generating section 500 provided in a digital signal processing section 57 on a drive board side.

The pulse generating section 202V generates a reset pulse RP and an edge pulse EP using the reset signal RS and the edge signal ES. For example, the reset pulse generating section 210V generates the reset pulse RP on the basis of the reset signal RS. The edge pulse generating section 220V generates the edge pulse EP on the basis of the edge signal ES. That is, timing of generation of the reset pulse RP is made synchronous with an edge of the reset signal RS, and timing of generation of the edge pulse EP is made synchronous with an edge of the edge signal ES. Suppose in this case that the reset pulse RP and the edge pulse EP are both an active-H pulse signal.

The reset pulse generating section 210V has an edge detecting circuit 212 as an example of a first edge detecting section. The edge pulse generating section 220V has an edge detecting circuit 222 as an example of a second edge detecting section. It suffices to apply publicly known techniques such for example as using a gate circuit such as a NAND (or AND) gate, a NOR (or OR) gate circuit, an inverter, an EX-OR gate and the like to the edge detecting circuits 212 and 222. When a non-inverting type logic gate is used as a delay element, and an input pulse signal and an output of the delay element are input to an EX-OR gate, both edges can be detected as an active H. When an inverting type logic gate is used as a delay element, and an input pulse signal and an output of the delay element are input to an AND gate, a rising edge can be detected as an active H, and when the input pulse signal and the output of the delay element are input to a NOR gate, a falling edge can be detected as an active H.

The reset pulse generating section 210V detects one of a rising edge and a falling edge of the input reset signal RS (a rising edge in this case) by the edge detecting circuit 212, generates the reset pulse RP, and supplies the reset pulse RP to the light emission level pattern storing section 230V (see FIG. 6C). As an example of modification, both of a rising edge and a falling edge of the reset signal may be detected to generate the reset pulse RP (see FIG. 6D).

The edge pulse generating section 220V detects both of a rising edge and a falling edge of the input edge signal ES by the edge detecting circuit 222, generates the edge pulse EP, and supplies the edge pulse EP to the light emission level pattern storing section 230V. While it suffices to generate one reset pulse RP per cycle of repetition of spaces and marks, a plurality of edge pulses EP need to be generated per cycle of repetition of spaces and marks. Thus, the frequency of the edge signal ES is controlled to a low frequency by generating the edge pulses EP from both edges of the edge signal ES.

The light emission level pattern storing section 230V stores power level information (recording waveform control signal pattern) for laser light emission in each timing in a case where the write strategy technique is applied. For example, the light emission level pattern storing section 230V includes a plurality of registers 232_1 to 232_$k$ (referred to collectively as a register set 231) and readout switches 234_1 to 234_$k$ provided to outputs of the respective registers 232_1 to 232_$k$.

The register set 231 functions as a main storing section. Output lines of the respective registers 232_1 to 232_$k$ and the corresponding readout switches 234_1 to 234_$k$ are plural so that multivalued levels of laser power when the write strategy technique is applied can be set. The number of multivalued levels and the number of output lines of the registers 232_1 to 232_$k$ and readout switches 234_1 to 234_$k$ may be the same, or may be different from each other by using a decoder. Suppose that in the basic configuration, the number of multivalued levels and the number of output lines of the registers 232_1 to 232_$k$ and readout switches 234_1 to 234_$k$ are the same.

According to the recording waveform control signal pattern, the light emission level pattern storing section 230V stores information on each light emission power level with an initial level of the recording waveform control signal pattern first and information defining a changing mode of the current switch section 250, which information corresponds to the information on each light emission power level, in the registers 232_1 to 232_$k$ in order. An example of the recording waveform control signal pattern will be described later. The control input terminal of the readout switch 234_1 in a first stage which switch is connected to the register 232_1 in the first stage which register retains information on the initial level is supplied with the reset pulse RP from the reset pulse generating section 210V. The control input terminals of the readout switches 234_2, . . . , and 234_$k$ connected to the registers 232_2, . . . , and 232_$k$ in the second and subsequent stages are supplied with the common edge pulse EP from the edge pulse generating section 220V. The readout switches 234_2 to 234_$k$ are sequential switches for selecting outputs of the registers 232_2 to 232_$k$ in order for each edge pulse EP.

The light emission level pattern storing section 230V in a recording mode outputs a plurality of current changing pulses SW for turning on/off each current switch of the current switch section 250 on the basis of the reset pulse RP, the edge pulse EP, and the power level information stored in the registers 232. Specifically, the light emission level pattern storing section 230V reads the power level information (particularly the current changing pulses SW for controlling the current switch section 250 in the present example) stored in the registers 232_2 to 232_$k$ in order in timing of the edge pulse EP. Then, a return is made to the reading of the register 232_1 storing the initial level (reference level) information in timing of the reset pulse RP.

The current source section 240 includes a reference current generating section 242 and a current output type DA converting section 244 (IDAC). The reference current generating section 242 generates respective digital reference current values corresponding to multivalued power levels in a recording mode and a Read power level in a reproduction (readout) mode in the light emission pulse waveform of the semiconductor laser 41 on the basis of the information of the light emission level pattern storing section 230V. For example, current information corresponding to each light emission power level is set as multi-bit digital data in the light emission level pattern storing section 230V, and each part of the reference current generating section 242 corresponding to each light emission power level takes in the current information.

The DA converting section 244 converts the current information (digital data) generated in the reference current generating section 242 to an analog signal, and outputs the analog signal. Each part of the DA converting section 244 is supplied with a laser power specifying voltage PW from the APC controlling section 58 via the flexible board 51. Each part of the DA converting section 244 adjusts a DA conversion gain on the basis of the laser power specifying voltage PW. The light emission power of the semiconductor laser 41 is feedback-controlled to a fixed value according to the laser power specifying voltage PW.

The current switch section 250 has a current switch 252 (Current SW) to set one or an arbitrary combination (superimposition) of the power reference currents converted to an analog signal in the DA converting section 244 in the recording mode. The current switch section 250 controls light emission power by turning on/off the current switch 252 on the basis of a plurality of pieces of level information (specifically the current changing pulses SW) read from the light emission level pattern storing section 230V.

In the present example, four values of Cool, Erase, Peak, and Over Drive are employed as multivalued levels in the recording mode (see FIG. 6B and FIG. 6C). In correspondence with this, the reference current generating section 242 includes separate reference current generating sections 242C, 242E, 242P, and 242OD for generating the four levels of reference current and a reference current generating section 242R for Read. The DA converting section 244 includes DA converting sections 244C, 244E, 244P, 244OD, and 244R in order to convert the reference currents generated in the reference current generating section 242 to an analog signal. The current switch 252 includes separate current switches 252C, 252E, 252P, 252OD, and 252R.

As shown in FIG. 6B, for example, the reference currents generated by the reference current generating section 242 are separate reference currents Ic, Ie, Ip, and Iod corresponding to the four values of Cool, Erase, Peak, and Over Drive, respectively. According to the employed configuration, the output pattern information of the current changing pulses SW for controlling the current switch 252 is also stored in the light emission level pattern storing section 230V. In the recording mode, four kinds of current changing pulses SW_1 to SW_4 are output from each register 232 in the light emission level pattern storing section 230V to control the levels of the four values. In the present example, the reference currents Ic, Ie, Ip, and Iod are supplied to the corresponding current switches 252C, 252E, 252P, and 252OD for Cool, Erase, Peak, and Over Drive, respectively. Thus, it suffices to turn on one current switch 252 by activating one of the four kinds of current changing pulses SW_1 to SW_4.

The laser driving section 270 has a laser changing circuit 272 and a driver circuit 274. The laser changing circuit 272 for example has a switch of a three-input-one-output type for selecting three systems of a first semiconductor laser 41_1 for a CD system, a second semiconductor laser 41_2 for a DVD system, and a third semiconductor laser 41_3 for a next-generation DVD system. The driver circuit 274 has a first driver circuit 274_1 for driving the first semiconductor laser 41_1, a second driver circuit 274_2 for driving the second semiconductor laser 41_2, and a third driver circuit 274_3 for driving the third semiconductor laser 41_3. The laser driving section 270 has provisions for the semiconductor lasers 41_1, 41_2, and 41_3 for the three kinds of recording media, which are CD, DVD, and next-generation DVD. The laser driving section 270 changes the semiconductor laser 41 according to a recording medium.

With such a configuration, the laser driving circuit 200V generates the light emission waveform of multivalued power to which the write strategy technique is applied by a combination of a bias current providing the threshold current of the semiconductor laser 41 and a plurality of current pulses. A laser power controlling system (APC controlling system) not shown in the figure controls the multivalued power such that the laser power of the semiconductor laser 41 becomes the light emission waveform of the multivalued power.

[Operation: Basic Configuration]

Suppose that as shown in FIG. 6C and FIG. 6D, data input for writing is non-return-to-zero data NRZIDATA. Suppose that space length is 2 T, and that mark length is 2 T or more (2 T, 3 T, 4 T, and 5 T are illustrated in the figures). A highest-speed signal performs a 2-T repetition.

When the write strategy technique is applied, in the present example, in each space length of 2 T, a Cool level is set during the first half of 1 T and an Erase level is set during the second half of 1 T. In a mark length of 2 T, the Erase level is set during the first half of 1 T and an Over Drive level is set during the second half of 1 T. In a mark length of 3 T, the Erase level is set during the first period of 1 T, the Over Drive level (O.D.) is set during the second period of 1 T, and a Peak level is set during the third period of 1 T.

In a mark length of 4 T, the Erase level is set during the first period of 1 T, the Over Drive level is set during the second period of 1 T, the Peak level is set during the third period of 1 T, and the Over Drive level is set during the fourth period of 1 T. In a mark length of 5 T, the Erase level is set during the first period of 1 T, the Over Drive level is set during the second period of 1 T, the Peak level is set during the third period of 1 T, the Peak level is set during the fourth period of 1 T, and the Over Drive level is set during the fifth period of 1 T. That is, in the mark length of 5 T, the Peak level is maintained during the third and fourth periods of 2 T, and a transition is made to the Over Drive level during the subsequent fifth period of 1 T.

Irrespective of mark length, the Erase level is maintained during 2 T from the second half of a space to the first period of a mark, and a transition is made to the Over Drive level during the subsequent period of 1 T. The light emission power levels have a relation O.D.>Peak>Erase>Cool.

In correspondence with such a recording waveform control signal pattern, as shown in FIG. 6E, information on the Cool level is stored as initial level in the register 232_1 in the first stage. Information on the Erase level is stored in the register 232_2 in the second stage. Information on the Over Drive level is stored in the register 232_3 in the third stage. Information on the Peak level is stored in the register 232_4 in the fourth stage. Information on the Over Drive level is stored in the register 232_5 in the fifth stage.

One reset signal RS and one edge signal ES are used as an input pulse signal. A reset pulse RP is generated on the basis of a rising edge of the one reset signal RS or a rising edge and a falling edge of the one reset signal RS. An edge pulse EP is generated on the basis of both edges of the one edge signal ES. Then, the pieces of power level information stored in the respective registers 232_1 to 232_5 of the light emission level pattern storing section 230V are read in order from a first area (Cool in the present example). For example, the readout switch 234_1 is turned on to read the power level information of the register 232_1 in the first stage when the reset pulse RP is an active H. Thereafter, each time the edge pulse EP becomes an active H, the readout switches 234_2 to 234_5 of a sequential switch configuration are sequentially turned on to read the power level information of the registers 232_2 to 232_5 in order.

For example, when all the power level information is read in order at a time of recording of a mark length of 4 T or a mark length of 5 T, the laser light emission power is changed in order of Cool→Erase→Over Drive→Peak→Over Drive.

Depending on the mark length of the non-return-to-zero data NRZIDATA, not all the levels are output. At a time of recording of a mark length of 2 T, power needs to be changed from Over Drive to Cool. In this case, the reset signal RS is supplied such that the reset pulse RP becomes an active H in timing immediately after Over Drive that is desired to be changed to Cool. Thereby information on Cool is read following Over Drive. Similarly, at a time of recording of a mark length of 3 T, it suffices to supply the reset signal RS such that the reset pulse RP becomes an active H in timing immediately after Peak desired to be changed to Cool so as to change power from Peak to Cool.

Laser Driving System

First Embodiment

Figure 7A:
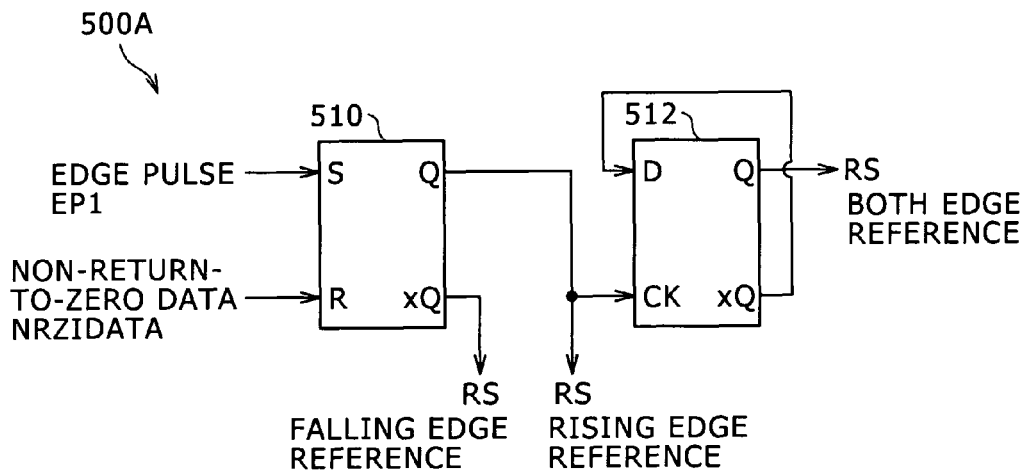
FIGS. 7A and 7B are diagrams of assistance in explaining an example of configuration of a transmission signal generating section according to a first embodiment.
Figure 7B:
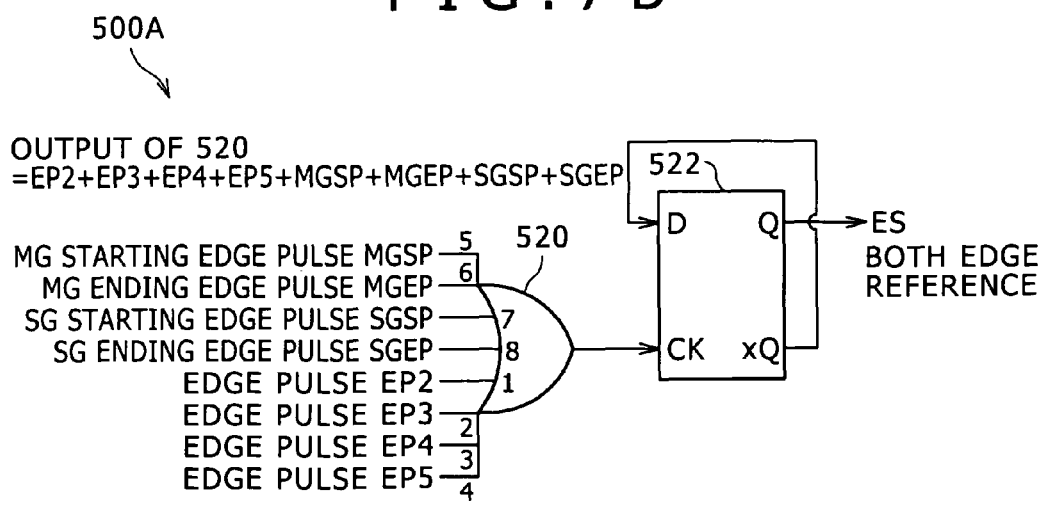
Figure 7C:
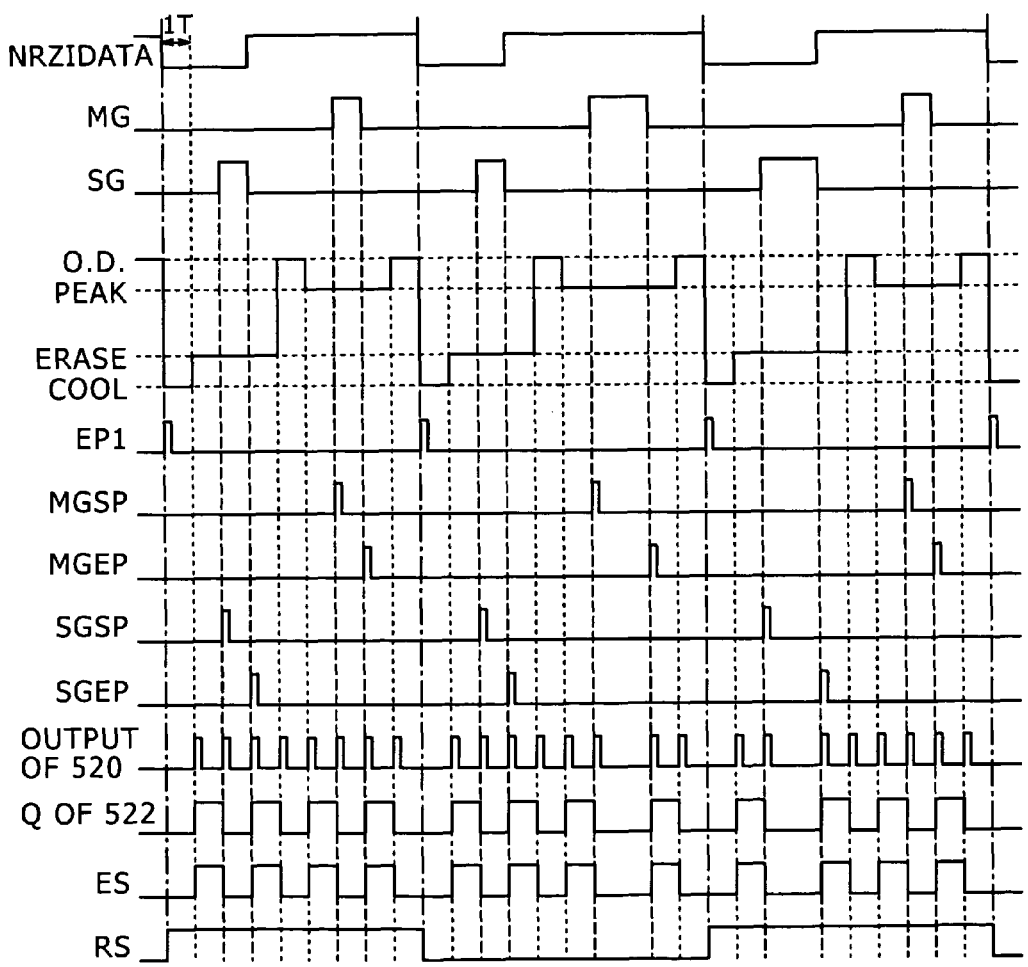
FIG. 7C is a diagram of assistance in explaining operation of the transmission signal generating section according to the first embodiment.
Figure 7E:
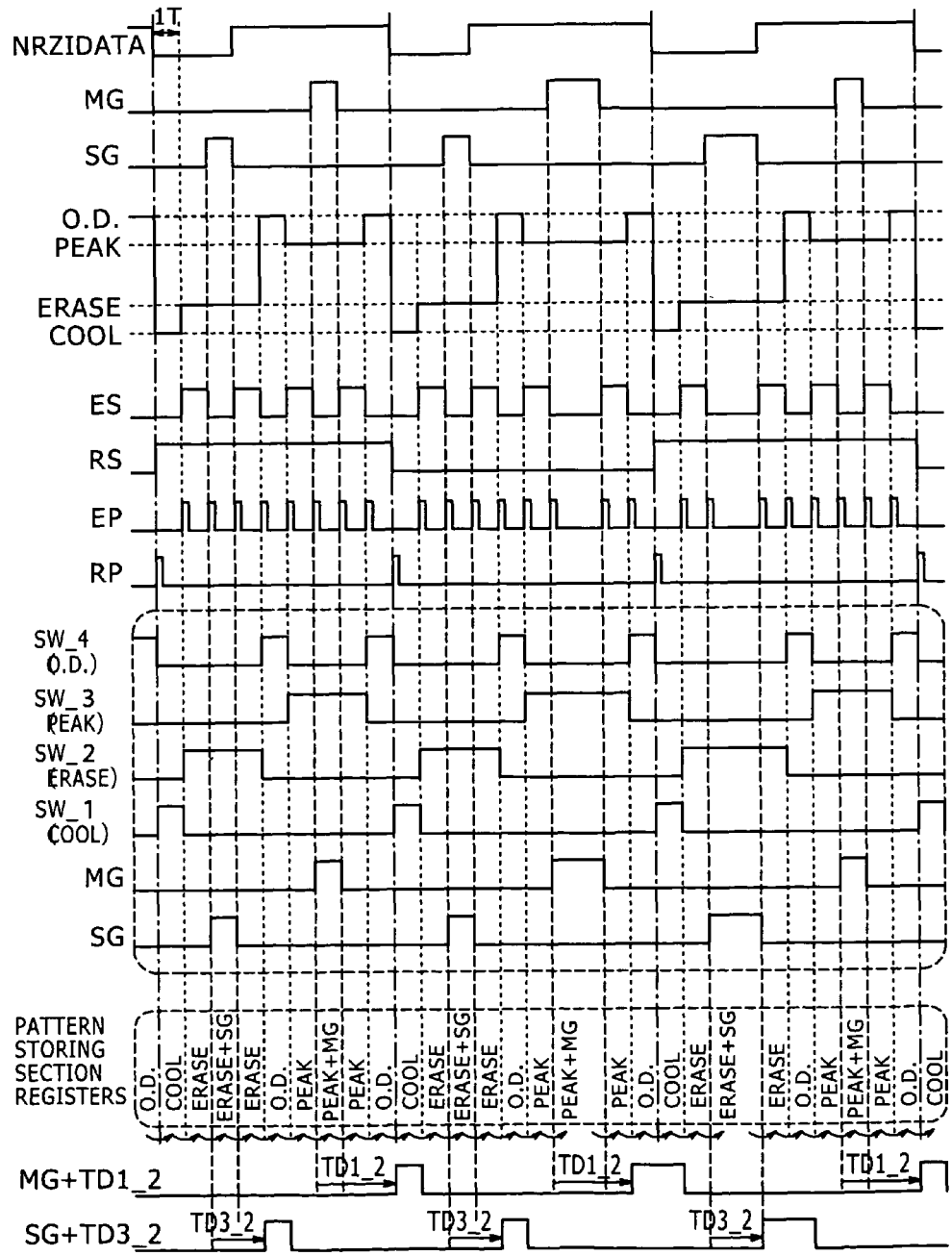
FIG. 7E is a diagram of assistance in explaining operation of the laser driving circuit according to the first embodiment.
Figure 7F:
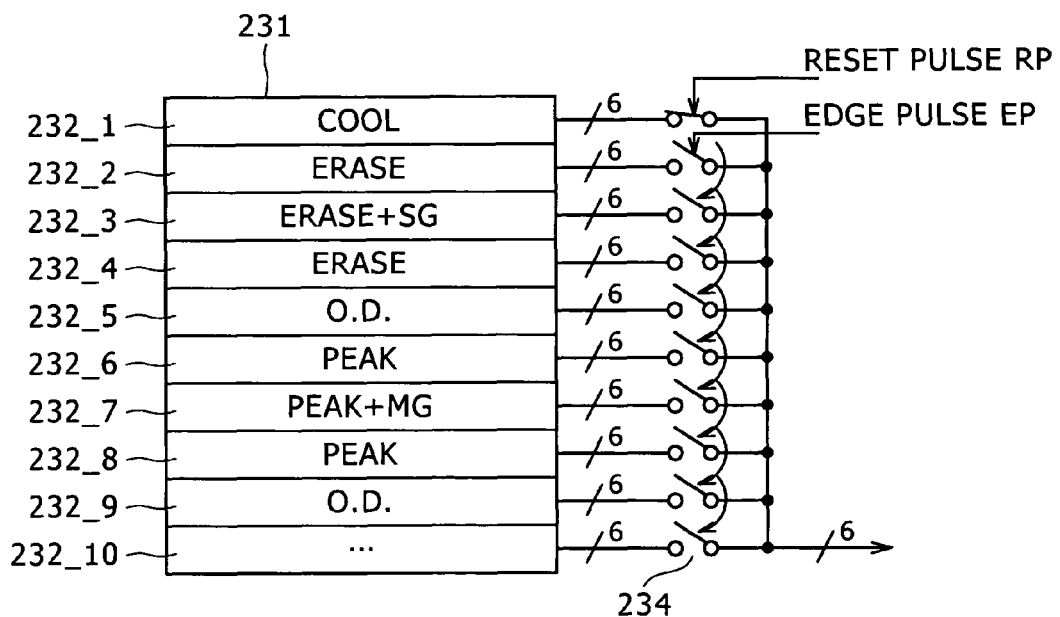
FIG. 7F is a diagram of assistance in explaining register setting information of a sampling pulse.

FIGS. 7A to 7F are diagrams of assistance in explaining a first embodiment of a laser driving system. FIGS. 7A and 7B are diagrams of assistance in explaining an example of configuration of a transmission signal generating section 500A according to a first embodiment. FIG. 7C is a diagram of assistance in explaining operation of the transmission signal generating section 500A according to the first embodiment. FIG. 7D is a diagram showing a laser driving circuit 200A according to the first embodiment. FIG. 7E is a diagram of assistance in explaining operation of the laser driving circuit 200A according to the first embodiment. FIG. 7F is a diagram of assistance in explaining register setting information of a sampling pulse pattern storing section 430A according to the first embodiment.

The first embodiment is a modification of the basic configuration of the sequential system such that edge timing of an input edge signal ES is provided with timing information of mark sampling and space sampling. In particular, the first embodiment has a feature in that the edge signal ES is provided with timing information on starting and ending of mark sampling and space sampling. Description will be made in the following centering on differences from the basic configuration.

Transmission Signal Generating Section

First Embodiment

As shown in FIGS. 7A and 7B, the transmission signal generating section 500A on a drive board side has a similar configuration for generating a reset signal RS to that of the basic configuration, but has a different configuration for generating an edge signal ES. The transmission signal generating section 500A is formed by modifying the transmission signal generating section 500V of the basic configuration such that timing information on starting and ending of mark sampling and space sampling is superimposed on edge timing when the edge signal ES is generated.

Specifically, the four-input type OR gate 520 is changed to an eight-input type OR gate 520. The OR gate 520 has a fifth input terminal supplied with an MG starting edge pulse MGSP, has a sixth input terminal supplied with an MG ending edge pulse MGEP, has a seventh input terminal supplied with an SG starting edge pulse SGSP, and has an eighth input terminal supplied with an SG ending edge pulse SGEP. No change is made otherwise.

In the present embodiment, the power level pattern of a pair of space and mark is set for one reset pulse RP, and therefore at least a configuration that does not superimpose the timing information of a space gate SG cannot be adopted. Thus, a configuration may be adopted in which the timing information of a space gate SG is always superimposed irrespective of space length but the timing information of a mark gate MG is not superimposed at the time of such a short mark (having a mark length of 3 T or less, for example) as to obviate a need for Over Drive after Peak.

On the other hand, superimposing neither of the timing information of a space gate SG nor the timing information of a mark gate MG at the time of a short space (having a space length of 3 T or less, for example) and a short mark. (having a mark length of 3 T or less, for example) is not possible. Always superimposing the timing information of a mark gate MG irrespective of mark length but not superimposing the timing information of a space gate SG at the time of a short space (having a space length of 3 T or less, for example) is not possible, either.

The MG starting edge pulse MGSP and the MG ending edge pulse MGEP will be described together as MG starting and ending edge pulses MGSP and MGEP. The SG starting edge pulse SGSP and the SG ending edge pulse SGEP will be described together as SG starting and ending edge pulses SGSP and SGEP.

As shown in FIG. 7C, based on the basic configuration, a D-type flip-flop 522 is logically inverted also in timing of the MG starting and ending edge pulses MGSP and MGEP and the SG starting and ending edge pulses SGSP and SGEP. The effect consequently appears in the logic of the edge signal ES. In the present example, the edge signal ES is logically inverted also in timing of the MG starting edge pulse MGSP, the MG ending edge pulse MGEP, the SG starting edge pulse SGSP, and the SG ending edge pulse SGEP. Edges of the edge signal ES have timing information of mark sampling and space sampling. The first embodiment is otherwise similar to the basic configuration.

In the first embodiment, information on ending timing of a mark gate MG and a space gate SG is also provided to edges of the edge signal ES. Thus, as shown in FIG. 7C, the ending timing of a mark gate MG can be set separately from the timing of an edge pulse EPS (second Over Drive), and the ending timing of a space gate SG can be set separately from the timing of an edge pulse EP3 (first Over Drive).

Laser Driving Circuit

First Embodiment

As shown in FIG. 7D, in the laser driving circuit 200A according to the first embodiment, the pulse generating section 202V is changed to a pulse generating section 202A, and the sampling pulse generating section 400 is changed to a sampling pulse generating section 400A. However, the configuration itself of the laser driving circuit 200A is similar to that of the basic configuration.

As a difference from the basic configuration, two kinds of current changing pulses are added to set the timing of starting and ending space gates SG and mark gates MG in the sampling pulse generating section 400. Thus, while a current switch section 250 may be configured so as to correspond to four kinds of current changing pulses SW_1 to SW_4, the registers 232 of a register set 231 are configured so as to correspond to six kinds of current changing pulses SW_1 to SW_6.

Memory Circuit

First Embodiment

As shown in FIG. 7F, a light emission level pattern storing section 230A according to the first embodiment is changed from the basic configuration such that the light emission level pattern storing section 230A stores information corresponding to not only the changing of a power level pattern but also the changing of setting information of a sampling pulse SP. That is, the register set 231 stores sampling pulse information ("MarkGate" and "SpaceGate") in addition to light emission level pattern information. The light emission level pattern storing section 230A is treated as serving as both the light emission level pattern storing section 230V and a part of the sampling pulse pattern storing section 430V, and power level pattern information and the setting information of the sampling pulse SP are stored together in a part of the registers 232 of an auxiliary storing section.

As described above, in the sequential system, output from the light emission level pattern storing section 230A (level information storing section) is timing pulses for turning on/off switches corresponding to the respective timing pulses. For example, Cool, Erase, and the like shown in the registers 232 within the register set 231 shown in FIG. 7F mean that timing pulses corresponding to the respective levels are generated and that the other bits are an L-level.

The first embodiment employs a mechanism for setting the ending timing of mark gates MG and space gates SG independently of the timing of Over Drive. For example, the register 232_3 following the register 232_2 having "Erase" set therein stores "SpaceGate" for generating a sampling pulse SP_2 (corresponding to a space gate SG) for a space in addition to information (Erase) defining the Erase level. This state will be described as "Erase+SpaceGate." In addition, the register 232_4 having "Erase" set therein is added following the register 232_3 having "Erase+SpaceGate" set therein, and information to be set in the subsequent register 232_5 and the like is shifted in order.

Further, the register 232_7 following the register 232_6 having "Peak" set therein stores "MarkGate" for generating a sampling pulse SP_1 (corresponding to a mark gate MG) for a mark in addition to information (Peak) defining the Peak level. This state will be described as "Peak+MarkGate." In addition, the register 232_8 having "Peak" set therein is added following the register 232_7 having "Peak+MarkGate" set therein, and information to be set in the subsequent register 232_9 and the like is shifted in order.

In this case, when "Erase+SpaceGate" is stored in the register set 231, for example, a period when the register 232_3 having "Erase+SpaceGate" set therein is accessed has an H-level only for timing of Erase and a space gate SG (see FIG. 7E). When "Peak+MarkGate" is stored in the register set 231, a period when the register 232_7 having "Peak+MarkGate" set therein is accessed has an H-level only for timing of Peak and a mark gate MG (see FIG. 7E).

A sampling pulse generating section 400A needs to retain only the delay time TD1_2 of a mark sampling pulse SP_1 and the delay time TD3_2 of a space sampling pulse SP_2 as the setting information of the sampling pulse SP in the sampling pulse pattern storing section 430A.

The sampling pulse generating section 400A generates the sampling pulses SP_1 and SP_2 in input edge timing while maintaining phase relation of output waveforms of mark gates MG and space gates SG. Thus, the sampling pulse generating section 400A includes a pulse delaying section 450 for obtaining the sampling pulses SP_1 and SP_2 by delaying a generated mark gate MG and a generated space gate SG by the delay times TD1_2 and TD3_2.

The pulse delaying section 450 may employ a phase shift configuration using logic gates (for example a BUF (buffer), an INV (inverter), an AND gate, an OR gate, a NAND gate, a NOR gate and the like) as delay elements, for example. Logic gates (hereinafter referred to also as delay gates) as delay elements are cascaded in multiple stages, a tap (output terminal) is drawn out from each point of connection, and final sampling pulses SP_1 and SP_2 are obtained from taps corresponding with the delay times TD1_2 and TD3_2.

For example, supposing that a delay time per delay gate is a delay time Tdly and that Delay Time TD1_2=N1×Tdly, it suffices to input a reproduced mark gate MG to a first stage and obtain the sampling pulse SP_1 from a point of connection at which the mark gate MG has been passed through the N1 delay elements. Similarly, supposing that a delay time per delay gate is a delay time Tdly and that Delay Time TD3_2=N3×Tdly, it suffices to input a reproduced space gate SG to a first stage and obtain the sampling pulse SP_2 from a point of connection at which the space gate SG has been passed through the N3 delay elements. For example, supposing that Delay Time Tdly=15 psec (0.015 nsec) and that a range of adjustment of the delay times TD1_2 and TD3_2 is 3 nsec, it suffices to provide 200 stages of a delay element and a tap change.

Operation

First Embodiment

The first embodiment provides information on not only starting timing but also ending timing of mark gates MG and space gates SG to the edge timing of the edge signal ES, and generates a sampling pulse SP according to the starting timing information and the ending timing information.

As for overall operation, timing of generating the reset pulse RP is not different from the basic configuration. However, because the edge timing of the edge signal ES input to the laser driving circuit 200A includes timing information of mark sampling and space sampling, timing in which the edge pulse EP becomes an H-level is different from the basic configuration. Specifically, timing of reading out the information of "Erase+SpaceGate" stored in the third register 232_3, "Erase" stored in the fourth register 232_4, "Peak+MarkGate" stored in the seventh register 232_7 and "Peak" stored in the eighth register 232_8 of the register set 231 is added to the edge pulse EP, and the edge pulse EP becomes an H-level also in that timing.

Further, as in the basic configuration, the reset pulse RP output from a logic gate 214 is supplied to the readout switch 234_1 of the light emission level pattern storing section 230A. The rest is the same as in the basic configuration and the like. A return is made to Cool set in the register 232_1 with the reset pulse RP, and each piece of information of the register 232_2 and subsequent registers is thereafter read out in order with the edge pulse EP.

The light emission level pattern storing section 230A notifies the pulse information of "SpaceGate" and "MarkGate" of "Erase+SpaceGate" and "Peak+MarkGate" to the sampling pulse generating section 400A. The sampling pulse generating section 400A generates sampling pulses SP_1 (corresponding to a mark gate MG) and SP_2 (space gate SG) according to the notified pulse information of "SpaceGate" and "MarkGate."

For example, when the register 232_3 having "Peak+MarkGate" set therein is accessed, an H-level is notified from the light emission level pattern storing section 230A to the sampling pulse generating section 400A. The timing of starting the access is the starting timing of a mark gate MG, and the timing of ending the access is timing of changing to Erase as a next level. By using the H-level notified from the light emission level pattern storing section 230A as it is, the sampling pulse generating section 400A can reproduce the space gate SG to be sent in a state of being superimposed on the edge signal ES on the side of a write strategy circuit 290. The sampling pulse generating section 400A generates the sampling pulse SP_2 for a space by delaying the reproduced space gate SG by the delay time TD3_2 while maintaining phase relation (respective positions of a rising edge and a falling edge) of waveform of the space gate SG.

Further, when the register 232_7 having "Peak+Mark-Gate" set therein is accessed, an H-level is notified from the light emission level pattern storing section 230A to the sampling pulse generating section 400A. The timing of starting the access is the starting timing of a mark gate MG, and the timing of ending the access is timing of changing to Peak as a next level. By using the H-level notified from the light emission level pattern storing section 230A as it is, the sampling pulse generating section 400A can reproduce the mark gate MG to be sent in a state of being superimposed on the edge signal ES on the side of the write strategy circuit 290. The sampling pulse generating section 400A generates the sampling pulse SP_1 for a mark by delaying the reproduced mark gate MG by the delay time TD1_2 while maintaining phase relation (respective positions of a rising edge and a falling edge) of waveform of the mark gate MG.

The first embodiment adds information defining timing of generation (a start and an end in particular) of the sampling pulse SP to the edge signal ES. Thus the sampling pulses SP_1 and SP_2 can be generated in a state of the starting timing and the ending timing being managed. The positions of a reproduced space gate SG and a reproduced mark gate MG are not different from positions with respect to a light emission level pattern when superimposed on the generating side. Thus, the side of the sampling pulse generating section 400A (within the IC of the sampling pulse generating section 400A) does not need to generate sampling pulse width or timing of a delay from a waveform monitoring signal or the like, and can generate sampling pulses with small variations and high precision. Because the starting timing and the ending timing are both set independently of timing of changing to another level, there is a degree of freedom of setting the sampling pulse width.

Example of Modification of First Embodiment

Figure 8A:
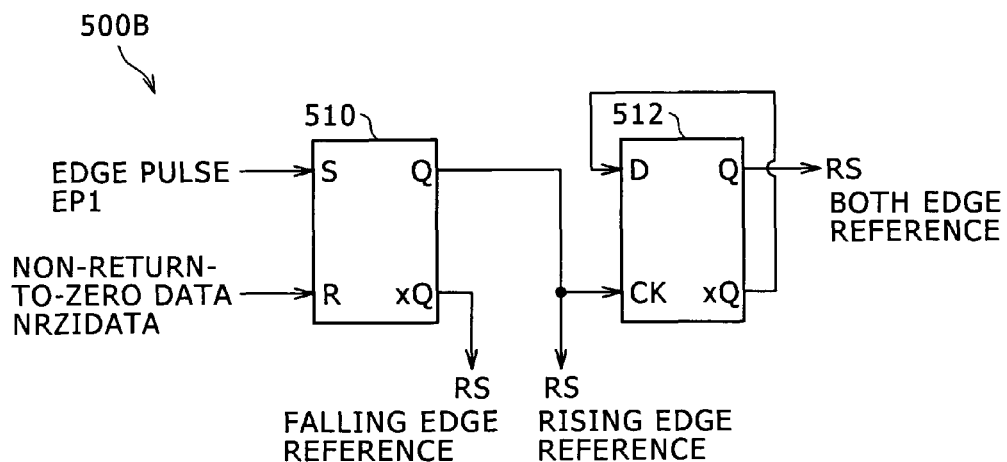
FIGS. 8A and 8B are diagrams of assistance in explaining an example of configuration of a transmission signal generating section according to the first embodiment (example of modification)
Figure 8B:
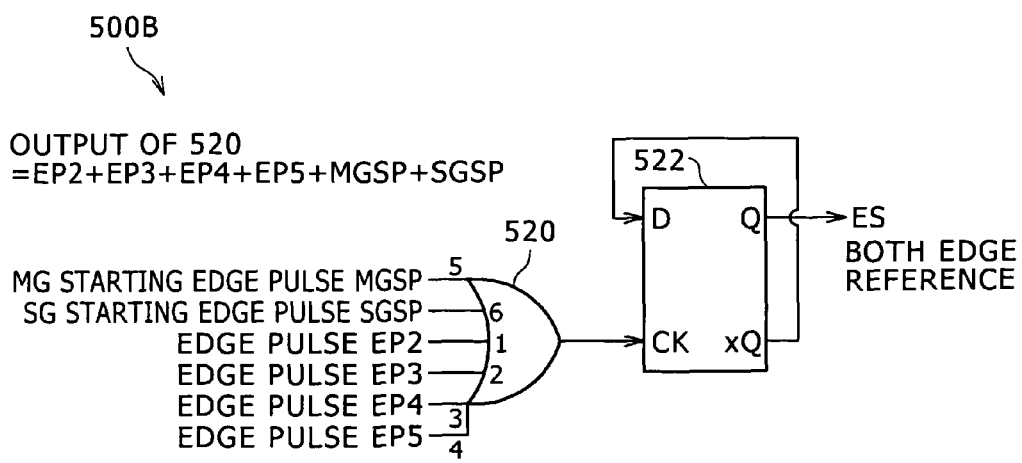
Figure 8C:
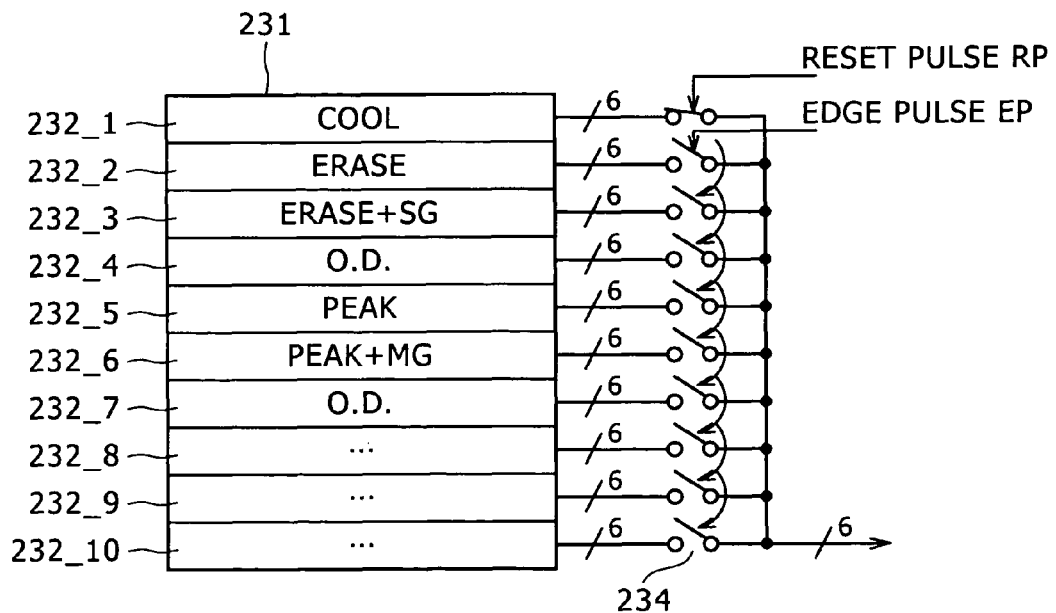
FIG. 8C is a diagram of assistance in explaining register setting information of a sampling pulse pattern storing section according to the first embodiment (example of modification)

FIGS. 8A to 8C are diagrams of assistance in explaining a laser driving system according to an example of modification of the first embodiment. FIGS. 8A and 8B are diagrams of assistance in explaining an example of configuration of a transmission signal generating section 500B according to the first embodiment (example of modification). FIG. 8C is a diagram of assistance in explaining register setting information of a sampling pulse pattern storing section 430B according to the first embodiment (example of modification). Diagrams of assistance in explaining operation of each of the sections will be omitted. The foregoing in comparison with this example of modification will be described as the first embodiment (basic example).

While the first embodiment (basic example) provides information on starting and ending of mark sampling and space sampling to the edge signal ES, this example of modification is modified so as to provide only starting timing information to the edge signal ES.

In order to deal with this, as shown in FIGS. 8A and 8B, the transmission signal generating section 500B has an OR gate 520 changed to a six-input type. This is because input of the MG ending edge pulse MGEP and the SG ending edge pulse SGEP in the transmission signal generating section 500A according to the first embodiment (basic example) is not necessary.

In this case, according to principles, a sampling pulse generating section 400 needs to have information for setting "sampling pulse width," as described in the section of the setting information of the sampling pulse SP (FIGS. 4 and 4B). However, in order to reduce even the information for specifying the "sampling pulse width," the ending timing of mark gates MG and space gates SG is the same timing as a start of a next power level. For example, it is desirable to set the end of a mark gate MG in the same timing as an edge pulse EPS, and set the end of a space gate SG in the same timing as an edge pulse EP3.

As shown in FIG. 8C, a laser driving circuit 200 has different setting information stored in the register set 231 of a light emission level pattern storing section 230. In short, a register having "Erase" set therein is omitted and a register 232_4 having Over Drive set therein is disposed following a register 232_3 having "Erase+SpaceGate" set therein, and information to be set in a subsequent register 232_5 and the like is shifted in order. In addition, a register having "Peak" set therein is omitted and a register 232_7 having Over Drive set therein is disposed following a register 232_6 having "Peak+MarkGate" set therein, and information to be set in a subsequent register 232_8 and the like is shifted in order.

Laser Driving System

Second Embodiment

Figure 9A:
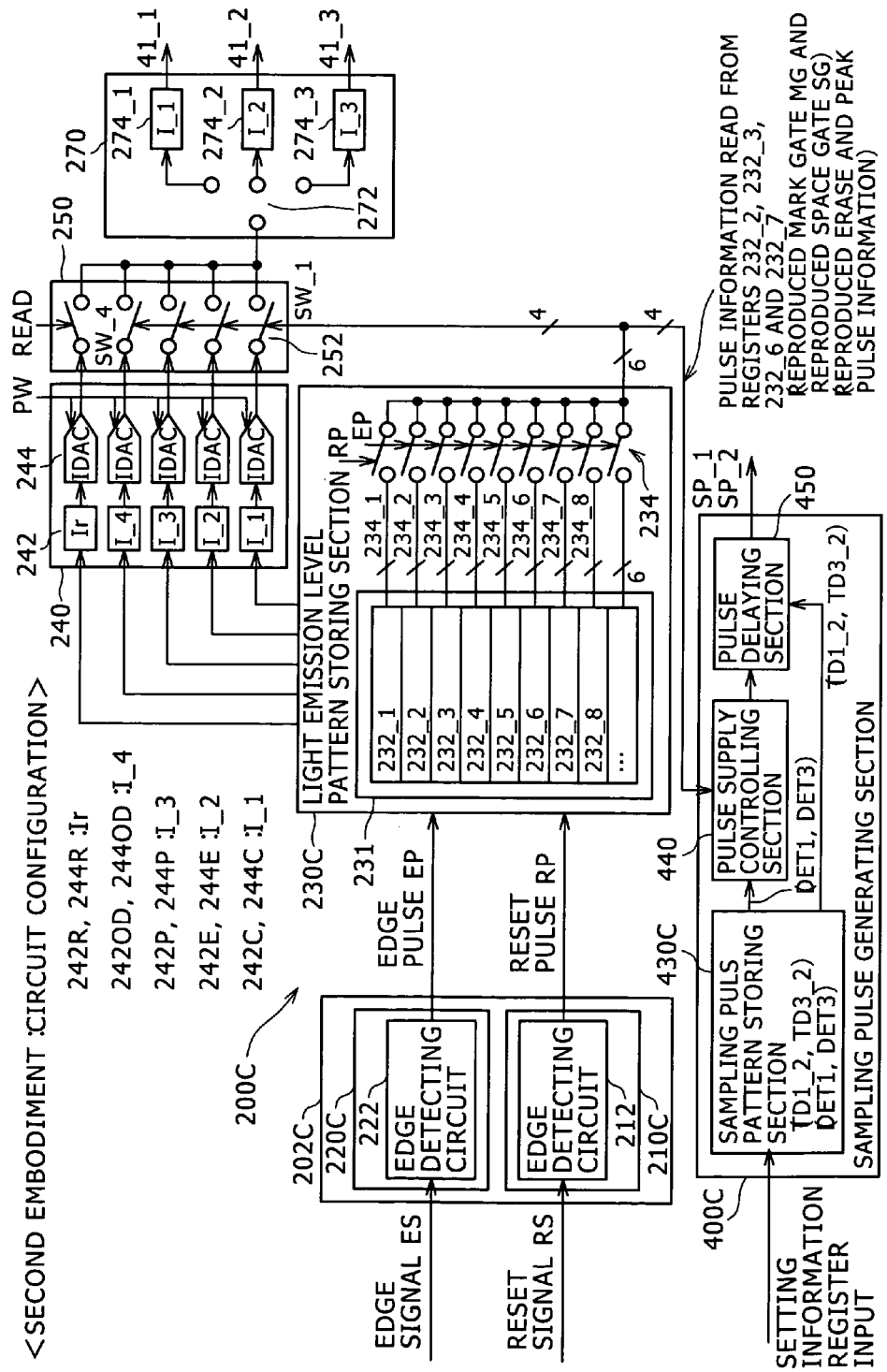
FIG. 9A is a diagram showing a laser driving circuit according to a second embodiment.

FIGS. 9A to 9C are diagrams of assistance in explaining a laser driving system according to a second embodiment. FIG. 9A is a diagram showing a laser driving circuit 200C according to the second embodiment. FIG. 9B is a diagram of assistance in explaining an example of configuration of a sampling pulse generating section 400C according to the second embodiment. FIG. 9C is a diagram of assistance in explaining operation of the sampling pulse generating section 400C according to the second embodiment. Though not shown, a transmission signal generating section 500C according to the second embodiment is similar to the transmission signal generating section 500A according to the first embodiment.

[Sampling Pulse Change]

Higher speed makes it difficult to perform sampling for APC with a short mark or a short space. On the other hand, the above-described sampling pulse setting examples allow a setting such that no sampling pulse is generated for a short mark or a short space of a specified length or less. This mechanism enables selective sampling only for a long mark or a long space exceeding the specified length.

The first example and the second example of the setting information of the sampling pulse determine whether or not to generate the sampling pulses SP_1 and SP_2 on the basis of the values of the sampling pulse output determination setting periods DET1 and DET3. Thus, there is basically no necessity to prepare two pieces of setting information. However, there are two meanings as follows, for example, in changing the settings of the sampling pulses.

1) When a signal indicating whether to output the sampling pulse SP or not can be superimposed on an input signal, it is not necessary to measure the sampling pulse output determination setting period DET1 or DET3 for determining output on the part of the sampling pulse generating section 400, and thus the sampling pulse generating section 400 is simplified.

2) When the level pattern of a short mark is changed with edge consecutiveness, amounts of change in power from Over Drive OD1 to Peak and from Over Drive OD2 to Peak (Peak is the same power) become different, and statically determinate time also becomes different. There accordingly arises a need to vary the rising edge position (rising edge delay time TD1_1) and the falling edge position (pulse delay time TD1_2) of the sampling pulse SP.

In this case, 1) changes only the sampling pulse settings, and 2) supposes combined use of the changing of the power level pattern and the changing of the sampling pulse settings.

A method using a dedicated terminal to change the setting information of the sampling pulse SP is also conceivable, but has problems of an increase in package area and accuracy of changing timing.

In order to deal with this, changing the setting information of the sampling pulse SP in the same manner as power level change is considered. At this time, when a reset pulse RP is generated for a pair of mark length and space length as in the basic configuration, and the setting information of mark sampling and space sampling is changed only by the reset pulse RP, each piece of setting information cannot be changed independently. In particular, when reset is performed in the middle of a space level, a return is made to the reference level of a space, and thus a mark level following the space is not output. That is, the ending level of a space cannot be selected arbitrarily.

This is true for the mechanism of the first embodiment that superimposes the timing information of the sampling pulse SP on the edge signal ES of the sequential system. That is, when the setting information in the register set 231 of the light emission level pattern storing section 230 is set as shown in FIG. 7F, the space gate SG or the mark gate MG cannot be stopped independently at the time of a short mark or a short space. Timing information on starting and ending of the space gate SG and the mark gate MG is basically superimposed on the edge signal ES irrespective of mark length or space length.

Incidentally, it is essentially possible to output the space gate SG and not to output the mark gate MG at the time of a short mark. It is necessary at least to superimpose the space gate SG on the edge signal ES irrespective of space length.

Laser Driving Circuit

Second Embodiment

As shown in FIG. 9A, in the laser driving circuit 200C according to the second embodiment, the pulse generating section 202A is changed to a pulse generating section 202C, and the sampling pulse generating section 400A is changed to a sampling pulse generating section 400C. However, the configuration itself of the laser driving circuit 200C is similar to that of the first embodiment.

The second embodiment has a pulse supply controlling section 440 for performing control on whether to generate a sampling pulse SP for a reproduced mark gate MG and a reproduced space gate SG in order to stop sampling pulses SP_1 and SP_2 for a mark and a space independently at the time of a short mark and at the time of a short space. The pulse supply controlling section 440 may be disposed in various stages. However, the pulse supply controlling section 440 is desirably disposed in a stage preceding a pulse delaying section 450 so as not to be affected by a setting of an amount of delay.

Gate pulses GP_1 and GP_2 corresponding to the sampling pulse output determination setting periods DET1 and DET3 described in the section of the setting information of the sampling pulse SP are generated by the pulse supply controlling section 440, and a mark gate MG and a space gate SG are turned off by the generated gate pulses GP_1 and GP_2. For example, when the sampling pulse output determination setting periods DET1 and DET3 are 10 ns, gate pulses GP_1 and GP_2 having a width of 10 ns from respective reference positions are generated, and a mark gate MG and a space gate SG within the ranges of the gate pulses GP_1 and GP_2 are turned off. When a peak level or a space level has a width of less than 10 ns, the sampling pulse SP_1 or SP_2 can be prevented from being supplied to a sample-hold circuit 332.

For example, a light emission level pattern storing section 230C notifies the sampling pulse generating section 400C of not only the pulse information of "SpaceGate" and "MarkGate" but also the pulse information of "Erase" and "Peak." The sampling pulse generating section 400C generates the sampling pulses SP_1 (corresponding to a mark gate MG) and SP_2 (space gate SG) according to the notified pulse information of "SpaceGate," "MarkGate," "Erase," and "Peak."

[Configuration of Sampling Pulse Generating Section]

FIG. 9B shows an example of configuration of the sampling pulse generating section 400C according to the second embodiment. The pulse supply controlling section 440 has an SG setting determining section 444S, an MG setting determining section 444M, and AND gates 445S and 445M. A pulse delaying section 450M for the sampling pulse SP_1 and a pulse delaying section 450S for the sampling pulse SP_2 are disposed in a stage succeeding the pulse supply controlling section 440.

As described in the first embodiment, the pulse delaying sections 450S and 450M each include a large number of cascaded delay gates (buffers 455 in this case) and switches 456 for tap selection between each point of connection (connection node between stages) and an output terminal. Which of the switches 456 to turn on is determined according to the pulse delay times TD1_2 and TD3_2 stored in a sampling pulse pattern storing section 430C.

The SG setting determining section 444S has an input terminal supplied with the timing pulse of "Erase" from the light emission level pattern storing section 230C, and has an output terminal connected to one input terminal of the AND gate 445S. Another input terminal of the AND gate 445S is supplied with the timing pulse of "SpaceGate" from the light emission level pattern storing section 230C. The output terminal of the AND gate 445S is connected to an input terminal of the pulse delaying section 450S.

The MG setting determining section 444M has an input terminal supplied with the timing pulse of "Peak" from the light emission level pattern storing section 230C, and has an output terminal connected to one input terminal of the AND gate 445M. Another input terminal of the AND gate 445M is supplied with the timing pulse of "MarkGate" from the light emission level pattern storing section 230C. The output terminal of the AND gate 445M is connected to an input terminal of the pulse delaying section 450M.

It suffices for each of the SG setting determining sections 444S and the MG setting determining section 444M to be of a multivibrator configuration, for example. The SG setting determining section 444S is to generate the gate pulse GP_2 for a window for a space gate SG. The SG setting determining section 444S sets an inverted output xQ to an L-level when receiving an active edge of the timing pulse of "Erase," and sets the inverted output xQ to an H-level after the passage of the sampling pulse output determination setting period DET3. The period of the L-level is set according to the sampling pulse output determination setting period DET3 stored in the sampling pulse pattern storing section 430C.

The MG setting determining section 444M is to generate the gate pulse GP_1 for a window for a mark gate MG. The MG setting determining section 444M sets an inverted output xQ to an L-level when receiving an active edge of the timing pulse of "Peak," and sets the inverted output xQ to an H-level after the passage of the sampling pulse output determination setting period DET1. Suppose in this case that both active edges are rising edges. The period of the L-level is set according to the sampling pulse output determination setting period DET1 stored in the sampling pulse pattern storing section 430C.

[Operation of Pulse Supply Controlling Section]

FIG. 9C shows operation of the sampling pulse generating section 400C (pulse supply controlling section 440 in particular) according to the second embodiment. Description in the following will be made of an example in which the sampling pulse SP_2 is not output when space length is 3 T or less and the sampling pulse SP_1 is not output when mark length is 4 T or less.

As described above, the present embodiment employs a configuration that sets a power level pattern for a pair of a space and a mark with one reset pulse RP. It is therefore necessary to superimpose the timing information of a space gate SG on an edge signal ES irrespective of space length at all times. Thus, a dummy space gate SG for preventing the generation of the sampling pulse SP_2 in the sampling pulse generating section 400 is superimposed at the time of a short space. In FIG. 9C, dummy space gates SG for preventing the generation of the sampling pulse SP_2 at the time of a short space are indicated by grid hatching.

On the other hand, a configuration may be adopted in which the timing information of a space gate SG is always superimposed irrespective of space length but the timing information of a mark gate MG is not superimposed at the time of such a short mark (having a mark length of 3 T or less, for example) as to obviate a need for Over Drive after Peak. When Over Drive after Peak is necessary, a mark gate MG needs to be superimposed irrespective of a Peak period. This means that even in the case of a short Peak period (Peak length is 1 T and total mark length is 4 T, for example), a mark gate MG needs to be superimposed to set an Over Drive level after the Peak period. Thus, a dummy mark gate MG for preventing the generation of the sampling pulse SP_1 in the sampling pulse generating section 400 is superimposed when a mark gate MG is superimposed at the time of a short mark (including the case of a short Peak length). In FIG. 9C, dummy mark gates MG for preventing the generation of the sampling pulse SP_1 at the time of a short mark (mark of 3 T to 4 T) are not superimposed at the time of a 2-T mark and are indicated by sand hatching.

Space gates SG at the time of a short space, the space gates SG being indicated by grid hatching, are present in the L-level period of the gate pulse GP_2, and space gates SG at the time of a long space (4 T or more) are present in the H-level period of the gate pulse GP_2. Thus, as output of the AND gate 445S, the space gates SG at the time of a short space, the space gates SG being indicated by grid hatching, are removed. Thus, in the case of a short space having a short space length, the sampling pulse SP_2 for the space can be prevented from being supplied to the sample-hold circuit 332.

Mark gates MG at the time of a short mark, the mark gates MG being indicated by sand hatching, are present in the L-level period of the gate pulse GP_1, and mark gates MG at the time of a long mark (5 T or more) are present in the H-level period of the gate pulse GP_1. Thus, as output of the AND gate 445M, the mark gates MG at the time of a short mark, the mark gates MG being indicated by sand hatching, are removed. Thus, in the case of a short mark having a short mark length, the sampling pulse SP_1 for the mark can be prevented from being supplied to the sample-hold circuit 332.

A control that supplies the sampling pulse SP_1 for a mark but does not supply the sampling pulse SP_2 for a space can be performed. Conversely, a control that does not supply the sampling pulse SP_1 for a mark but supplies the sampling pulse SP_2 for a space can be performed.

Of course, the supply of the sampling pulses SP_1 and SP_2 to the sample-hold section 330 is not limited to being controlled to be turned on (supply) or off (stopped) for a mark and a space independently, but can be subjected to on/off control with both set as a pair.

Comparison with Comparative Examples

FIGS. 10A to 10C are diagrams of assistance in explaining a first to a third comparative example of a signal interface method when a semiconductor laser 41 is driven by applying the write strategy technique. Advantages of the mechanism of the present embodiment will be described by comparison with these comparative examples.

In the first comparative example shown in FIG. 10A, a write strategy circuit 290X (light emission waveform pulse generating section) is mounted on a drive board. In this case, the drive board supplies a laser driving circuit 200X mounted in an optical pickup 14 with a write strategy signal (referred to also as a recording pulse signal or a laser driving timing signal) defining light emission timing corresponding to each power level and a laser power specifying voltage PW. The laser driving circuit 200X has a light emission waveform generating section 203 for generating a light emission waveform by synthesizing the write strategy signal and the laser power specifying voltage PW. The light emission waveform generating section 203 makes a semiconductor laser 41 emit light by generating a driving current while increasing and decreasing power according to the laser power specifying voltage PW.

In such a configuration, the write strategy signal sent from the write strategy circuit 290X has finer timing information than a channel clock, but the following problems involved in recent improvement in recording speed are presented. First, an increase of power levels increases the number of transmissions of signal lines of a recording system. For example, this is indicated by 4 to 5 ch provided for LVDS (Low Voltage Differential Signal). Second, it is difficult to transmit the write strategy signal accurately because of degradation in frequency characteristic (transmission band reduction) due to the flexible board 51. Intervals of the write strategy signal cannot be transmitted accurately, which hinders improvement in recording speed. In addition, an edge shift is caused by intersymbol interference at a shortest pulse (for example about 1 T).

In addition, directing attention to an APC controlling system in such a configuration, a power monitoring signal PM generated on the optical pickup 14 side is obtained by detecting laser light corresponding to the write strategy signal sent from the write strategy circuit 290X. Hence, the power monitoring signal PM also has problems caused by a flexible board 51 as with the write strategy signal. Problems occur because the power monitoring signal PM is degraded and is difficult to transmit accurately due to the frequency characteristic of the flexible board 51. In addition, delay variations occur, and a sampling gate cannot be opened because of a shorter pulse due to an increase in speed.

In the second comparative example shown in FIG. 10B, a write strategy circuit 200Y is mounted on the optical pickup 14 side rather than on a drive board. In this case, the write strategy circuit 200Y generates a timing signal for controlling optical power from a recording clock and recording data. The timing signal has smaller units than a channel clock interval (Tw), and is generated for each power level. The power level and timing are set in a one-to-one correspondence with each other.

The write strategy circuit 200Y for realizing this includes for example a phase-locked circuit, a memory, an address encoder, and a timing generating circuit. The phase-locked circuit generates a multiphase clock for generating a unit smaller than the channel clock interval (Tw). The memory stores level information. The address encoder determines recording data length, and generates a memory address. The timing generating circuit converts timing information read from the memory according to the recording data length into a timing signal. In this case, directing attention to the APC controlling system, it suffices to convert the power monitoring signal PM into a power monitoring voltage PD in a low-frequency state by sampling the power monitoring signal PM and then transmit the power monitoring voltage PD to the drive board side via the flexible board 51.

In such a configuration, the signals of the recording system which signals are transmitted by the flexible board 51 are the recording clock and the recording data, so that problems in transmitting the write strategy signal of high frequency are solved. For example, the number of LVDS channels for write strategy transmission is reduced, and neither of the recording clock nor the recording data, which are signals in channel clock units, is easily affected by the transmission characteristic of the flexible board 51.

In addition, the APC controlling system includes a sample-hold circuit 330 in a power monitoring circuit 300B on the optical pickup 14 side, and is thereby able to make transmission of the power monitoring voltage PD. Therefore the problem due to the transmission of the power monitoring signal PM of high frequency through the flexible board 51 is solved.

However, the write strategy circuit 290Y mounted on the optical pickup 14 side includes the phase-locked circuit, the memory, the address encoder, and the timing generating circuit. There are thus drawbacks in that the laser driving circuit 200Y has a large scale (has a large chip area and a large package area), power consumption is increased, and the problem of heat generation occurs.

In addition, as in the third comparative example shown in FIG. 10C as an example of configuration formed by combining the two examples described above, disposing a write strategy circuit 290X on a drive board side (recording and reproduced signal processing section 50) and disposing a sample-hold circuit 330 on an optical pickup 14 side is considered. In this case, however, in a simple configuration, a sampling pulse SP for a sample-hold section 330 is generated by a sampling pulse generating section 400X attached to the write strategy circuit 290X, and the sampling pulse SP is transmitted to the sample-hold circuit 330 via a flexible board 51. Thus, an increase in the number of pieces of flexible board wiring and signal degradation of the sampling pulse SP due to flexible board transmission become new problems. Further, for high-speed transmission of the sampling pulse SP, in consideration of LVDS provision, the sample-hold circuit 330 needs to have an LVDS-ready input circuit for the sampling pulse SP, so that the number of terminals is increased.

Thus, each of the comparative examples described above has drawbacks in terms of the number of signal transmissions and a reduction in transmission band in the signal transmission of the recording system and the signal transmission of the APC controlling system or the circuit scale when the write strategy circuit 290 is disposed in the laser driving circuit 200.

On the other hand, the mechanism of the present embodiment reduces the number of signal lines for transmitting a light emission waveform pulse pattern for the write strategy technique by transmitting the timing information of the light emission waveform pulse pattern by the sequential system using two kinds of transmission signals whose edges have the timing information. Further, the setting information (timing information) of a sampling pulse for APC control is superimposed on one of the two kinds of transmission signals (edge signal ES in the foregoing embodiment). Thus, transmission wiring dedicated to the sampling pulse is not necessary, and setting information for the timing information of the sampling pulse does not need to be stored on the pickup side.

The number of transmission signal lines as a whole for the light emission waveform pulse pattern and for the sampling pulse can be greatly reduced, the problems of the number of transmissions and a reduction in transmission band are solved, and obstacles caused by the securing of an arrangement space for signal lines and a length for routing the signal lines are removed.

The present application contains subject matter related to that disclosed in Japanese Priority Patent Application JP 2009-094633 filed in the Japan Patent Office on Apr. 9, 2009, the entire content of which is hereby incorporated by reference.

It should be understood by those skilled in the art that various modifications, combinations, sub-combinations and alterations may occur depending on design requirements and other factor in so far as they are within the scope of the appended claims or the equivalents thereof.

What is claimed is:
1. A laser driving device comprising:
a sample-hold section configured to sample and hold an electric signal based on laser light emitted from a laser element;
a first pulse generating section configured to generate a reference pulse indicating one of changing timing in repetition of a space and a mark and timing of changing between said space and said mark by detecting an edge of a first transmission signal indicating, by said edge, information defining timing of obtaining said reference pulse;
a second pulse generating section configured to generate a changing pulse indicating changing timing of divided power levels of respective light emission waveforms of said space and said mark and timing of a sampling pulse for sampling and holding said electric signal by detecting an edge of a second transmission signal indicating, by said edge, information defining timing of obtaining said changing pulse;
a light emission waveform generating section configured to output reference level information as level information on a level at a position of said reference pulse, said level information being included in power level information on each power level of said light emission waveforms, for each said reference pulse, and output other level information following said reference level information in order for each said changing pulse;
a storing section configured to store setting information defining a recording waveform control signal pattern indicating the power level information of said light emission waveforms for driving said laser element at the power levels of the respective light emission waveforms of said space and said mark and a pulse pattern of said sampling pulse; and a sampling pulse generating section configured to generate said sampling pulse on a basis of the setting information of said pulse pattern, the setting information being stored in said storing section, and supply said sampling pulse to said sample-hold section;

wherein the reference level information as level information on the level at the position of said reference pulse, said level information being included in the power level information of the respective light emission waveforms of said space and said mark, is read out from said storing section for each said reference pulse, and then the other level information following said reference level information is read out from said storing section in order for each said changing pulse.

2. The laser driving device according to claim 1, wherein said storing section stores setting information defining starting timing of said sampling pulse together with one of pieces of power level information of said light emission waveforms.

3. The laser driving device according to claim 2, wherein ending timing of said sampling pulse is defined by timing of reading power level information following the starting timing of said sampling pulse excluding said reference level information.

4. The laser driving device according to claim 2, further comprising a sampling pulse pattern storing section configured to store setting information on the ending timing of said sampling pulse.

5. The laser driving device according to claim 1, wherein said storing section stores setting information defining starting timing of said sampling pulse and setting information defining ending timing of said sampling pulse together with one of pieces of power level information excluding said reference level information of said light emission waveforms.

6. The laser driving device according to claim 1, further comprising:
a sampling pulse pattern storing section configured to store setting information on a delay time for said sampling pulse generated on a basis of the setting information of said pulse pattern, the setting information of said pulse pattern being stored in said storing section; and
a pulse delaying section configured to delay said sampling pulse generated on the basis of the setting information of said pulse pattern, the setting information of said pulse pattern being stored in said storing section, on a basis of the setting information on said delay time, the setting information on said delay time being stored in said sampling pulse pattern storing section.

7. The laser driving device according to claim 1, wherein said sampling pulse generating section has a pulse supply controlling section configured to perform control on whether to supply or stop supply of said sampling pulse to said sample-hold section according to length of said mark and/or said space differently for said mark and said space.

8. The laser driving device according to claim 7, wherein said pulse supply controlling section performs control on whether to supply or stop supply of said sampling pulse to said sample-hold section according to length of said mark and/or said space differently for said mark and said space.

9. A laser driving method comprising the steps of:
storing setting information defining a recording waveform control signal pattern indicating power level information of light emission waveforms for driving a laser element at power levels of the respective light emission waveforms of a space and a mark and a pulse pattern of a sampling pulse for sampling and holding an electric signal based on laser light emitted from said laser element in a light emission level pattern storing section;
generating a reference pulse indicating one of changing timing in repetition of said space and said mark and timing of changing between said space and said mark by detecting an edge of a first transmission signal indicating, by said edge, information defining timing of obtaining said reference pulse;
generating a changing pulse indicating changing timing of divided power levels of the respective light emission waveforms of said space and said mark and timing of said sampling pulse by detecting an edge of a second transmission signal indicating, by said edge, information defining timing of obtaining said changing pulse; and
setting the power levels of said light emission waveforms and obtaining said sampling pulse by reading reference level information as level information on a level at a position of said reference pulse, the level information being included in the power level information of the respective light emission waveforms of said space and said mark and the setting information of said sampling pulse, the power level information of the respective light emission waveforms of said space and said mark and the setting information of said sampling pulse being stored in said light emission level pattern storing section, for each said reference pulse, and reading other information following said reference level information in order for each said changing pulse.

10. A light device comprising:
a laser element;
a driving section configured to drive said laser element;
a sample-hold section configured to sample and hold an electric signal based on laser light emitted from said laser element;
an optical member for guiding the laser light emitted from said laser element;
a light emission waveform pulse generating section configured to generate a plurality of pulse signals defining light emission waveforms formed by a combination of driving signals having different levels for a space and a mark on a basis of a recording clock and recording data;
a transmission signal generating section configured to generate a first transmission signal indicating, by an edge, information defining timing of obtaining a reference pulse indicating one of changing timing in repetition of said space and said mark and timing of changing between said space and said mark and a second transmission signal indicating, by an edge, information defining timing of obtaining a changing pulse indicating changing timing of said light emission waveforms and timing of a sampling pulse for sampling and holding the electric signal based on the laser light emitted from said laser element on a basis of the plurality of pulse signals generated by said light emission waveform pulse generating section;
a pulse generating section including
a first pulse generating section configured to generate said reference pulse on a basis of the edge of said first transmission signal, and a second pulse generating section configured to generate said changing pulse on a basis of the edge of said second transmission signal;

a storing section configured to store a recording waveform control signal pattern indicating level information for said light emission waveforms and setting information of said sampling pulse;

a light emission waveform generating section configured to read reference level information as level information on a level at a position of said reference pulse, said level information being included in power level information of the respective light emission waveforms of said space and said mark, from said storing section for each said reference pulse, and then output other information following said reference level information in order for each said changing pulse;

a sampling pulse generating section configured to generate said sampling pulse on a basis of the setting information of said pulse pattern, the setting information of said pulse pattern being stored in said storing section, and supply said sampling pulse to said sample-hold section; and a transmitting member for transmitting a signal, the transmitting member being interposed between a first mounting section in which said laser element, said driving section, said sample-hold section, said optical member, said pulse generating section, said light emission waveform generating section, and said storing section are mounted and a second mounting section in which said light emission waveform pulse generating section and said transmission signal generating section are mounted.

11. An optical unit comprising:
a laser element;
a driving section configured to drive said laser element;
a sample-hold section configured to sample and hold an electric signal based on laser light emitted from said laser element;
an optical member for guiding the laser light emitted from said laser element;
a pulse generating section including
  a first pulse generating section configured to generate a reference pulse on a basis of a first transmission signal indicating, by an edge, information defining timing of obtaining said reference pulse indicating one of changing timing in repetition of a space and a mark and timing of changing between said space and said mark, and
  a second pulse generating section configured to generate a changing pulse on a basis of a second transmission signal indicating, by an edge, information defining timing of obtaining said changing pulse indicating changing timing of said light emission waveforms and timing of a sampling pulse for sampling and holding the electric signal based on the laser light emitted from said laser element;
a storing section configured to store a recording waveform control signal pattern indicating level information for said light emission waveforms and setting information of said sampling pulse;
a light emission waveform generating section configured to read reference level information as level information on a level at a position of said reference pulse, said level information being included in power level information of the respective light emission waveforms of said space and said mark, from said storing section for each said reference pulse, and then output other information following said reference level information in order for each said changing pulse; and a sampling pulse generating section configured to generate said sampling pulse on a basis of the setting information of said pulse pattern, the setting information of said pulse pattern being stored in said storing section, and supply said sampling pulse to said sample-hold section.

12. The optical unit according to claim 11,
wherein said pulse generating section and said sampling pulse generating section are formed in an identical semiconductor integrated circuit.

13. A laser driving device comprising:
sample-hold means for sampling and holding an electric signal based on laser light emitted from a laser element;
first pulse generating means for generating a reference pulse indicating one of changing timing in repetition of a space and a mark and timing of changing between said space and said mark by detecting an edge of a first transmission signal indicating, by said edge, information defining timing of obtaining said reference pulse;
second pulse generating means for generating a changing pulse indicating changing timing of divided power levels of respective light emission waveforms of said space and said mark and timing of a sampling pulse for sampling and holding said electric signal by detecting an edge of a second transmission signal indicating, by said edge, information defining timing of obtaining said changing pulse;
light emission waveform generating means for outputting reference level information as level information on a level at a position of said reference pulse, said level information being included in power level information on each power level of said light emission waveforms, for each said reference pulse, and outputting other level information following said reference level information in order for each said changing pulse;
storing means for storing setting information defining a recording waveform control signal pattern indicating the power level information of said light emission waveforms for driving said laser element at the power levels of the respective light emission waveforms of said space and said mark and a pulse pattern of said sampling pulse; and
sampling pulse generating means for generating said sampling pulse on a basis of the setting information of said pulse pattern, the setting information being stored in said storing means, and supplying said sampling pulse to said sample-hold means;
  wherein the reference level information as level information on the level at the position of said reference pulse, said level information being included in the power level information of the respective light emission waveforms of said space and said mark, is read out from said storing means for each said reference pulse, and then the other level information following said reference level information is read out from said storing means in order for each said changing pulse.

* * * * *